US012680829B2

(12) United States Patent
Volkerink et al.

(10) Patent No.: US 12,680,829 B2
(45) Date of Patent: Jul. 14, 2026

(54) WIRELESS INFRASTRUCTURE SETUP AND ASSET TRACKING, AND METHOD THEREOF

(71) Applicant: Trackonomy Systems, Inc., San Jose, CA (US)

(72) Inventors: Hendrik J. Volkerink, Palo Alto, CA (US); Ajay Khoche, West San Jose, CA (US); Aaron Storrs, Santa Cruz, CA (US); Varun Khatri, Santa Clara, CA (US)

( * ) Notice: Subject to any disclaimer, the term of this patent is extended or adjusted under 35 U.S.C. 154(b) by 297 days.

(21) Appl. No.: 18/055,794

(22) Filed: Nov. 15, 2022

(65) Prior Publication Data

US 2023/0152122 A1 May 18, 2023

Related U.S. Application Data

(60) Provisional application No. 63/279,332, filed on Nov. 15, 2021.

(51) Int. Cl.
*G01C 21/00* (2006.01)
*G01C 21/32* (2006.01)

(52) U.S. Cl.
CPC ......... *G01C 21/3833* (2020.08); *G01C 21/32* (2013.01); *G01C 21/3811* (2020.08)

(58) Field of Classification Search
CPC .. G06Q 10/087; G06Q 10/0833; G06Q 10/08; H04W 4/80; H04W 4/029;

(Continued)

(56) References Cited

U.S. PATENT DOCUMENTS 7,330,112 B1    2/2008  Emigh
8,611,321 B2   12/2013  Herrala
                (Continued)

FOREIGN PATENT DOCUMENTS

AU    2018204317 A1    1/2019
AU    2018250358 A1    5/2019
                (Continued)

OTHER PUBLICATIONS

Peter Ibach, Vladimir Stantchev, Florian Lederer, Andreas Weiß, 2005, WLAN-Based Asset Tracking for Warehouse Management (Year: 2005).*

(Continued)

*Primary Examiner* — Rachid Bendidi
*Assistant Examiner* — Joseph Anderson Yanoska

(57) ABSTRACT

Systems and methods receive an image of at least part of an environmental layout and at least two geographic feature locations associated with the image. At least two geographic locations are determined, each corresponding to a respective one of the at least two geographic feature locations and a map scale is determined for the images based on the at least two geographic feature locations and the at least two geographic locations. The map scale allows conversion between points on the image and geographic locations. The image and the map scale are used to display a location interface on a client device that allows a user to search the environmental layout for an asset associated with a tracking node, where the location interface graphically displays graphical elements indicative of communication recency between the tracking tag and one or more infrastructure nodes.

24 Claims, 33 Drawing Sheets

(58) Field of Classification Search

CPC ....... H04W 4/02; H04W 84/18; H04W 4/023;
G08B 13/2462; G08B 13/2417; G08B
21/0261; G08B 13/2448; G01C 21/3833;
G01C 21/32; G01C 21/3811; G01C 21/20

See application file for complete search history.

(56)  References Cited

U.S. PATENT DOCUMENTS

| | | |
|---|---|---|
| 8,929,931 B1 | 1/2015 | Goldberg |
| 9,104,695 B1* | 8/2015 | Cervelli .................. G06F 16/50 |
| 9,467,660 B1* | 10/2016 | Edelstein ................. H04N 7/18 |
| 9,538,332 B1 | 1/2017 | Medelson |
| 9,784,816 B2 | 10/2017 | Jalali |
| 9,872,151 B1 | 1/2018 | Puzanov |
| 10,244,348 B2 | 3/2019 | Kostka |
| 10,299,079 B1* | 5/2019 | Hurley ..................... H04W 4/08 |
| 11,115,732 B2 | 9/2021 | Lucrecio et al. |
| 11,281,958 B2 | 3/2022 | Volkerink |
| 2004/0012524 A1 | 1/2004 | Couronne et al. |
| 2005/0110639 A1* | 5/2005 | Puzio ................. G08B 13/2462 |
| | | 340/572.1 |
| 2006/0080074 A1 | 4/2006 | Williams et al. |
| 2006/0176179 A1 | 8/2006 | Skorpik et al. |
| 2007/0275735 A1* | 11/2007 | Estevez .................. G09B 29/10 |
| | | 455/457 |
| 2010/0171763 A1 | 7/2010 | Bhatt et al. |
| 2010/0201488 A1* | 8/2010 | Stern .................... G06K 7/0008 |
| | | 340/10.1 |
| 2010/0201520 A1 | 8/2010 | Stern et al. |
| 2011/0074582 A1 | 3/2011 | Alexis |
| 2011/0266342 A1* | 11/2011 | Forster ............... G06K 7/10168 |
| | | 235/438 |
| 2012/0100868 A1* | 4/2012 | Kim ...................... H04W 4/023 |
| | | 455/456.1 |
| 2012/0116675 A1 | 5/2012 | Iles |
| 2015/0018011 A1 | 1/2015 | Mendelson |
| 2015/0365806 A1* | 12/2015 | Parviainen et al. |
| 2016/0188141 A1* | 6/2016 | Lin ........................ G06F 3/0484 |
| | | 715/790 |
| 2017/0024997 A1* | 1/2017 | Venuturumilli ........ G06Q 10/08 |
| 2017/0142639 A1 | 5/2017 | Meredith et al. |
| 2017/0371322 A1 | 12/2017 | Lake |
| 2018/0121571 A1 | 5/2018 | Tiwari |
| 2019/0037362 A1 | 1/2019 | Nogueira-Nine |
| 2019/0072390 A1* | 3/2019 | Wang ................. G06K 7/10386 |
| 2021/0067595 A1* | 3/2021 | Gum ..................... H04W 4/029 |
| 2021/0201569 A1 | 7/2021 | Marschner et al. |
| 2022/0364878 A1* | 11/2022 | DeLuca ................. G06T 11/001 |
| 2023/0121652 A1* | 4/2023 | Francis ................ G06Q 10/087 |
| | | 705/26.8 |

FOREIGN PATENT DOCUMENTS

| | | | | |
|---|---|---|---|---|
| CA | 3 061 878 A1 | 11/2018 | | |
| CA | 3 008 512 A1 | 12/2018 | | |
| CN | 106989747 A | * | 7/2017 | .......... G01C 21/206 |

OTHER PUBLICATIONS

C. K. M. Lee, C. M. Ip, Taezoon Park, S.Y. Chung, 2019, A Bluetooth Location-based Indoor Positioning System for Asset Tracking in Warehouse (Year: 2019).*

Attila Frankó, Gergely Vida, andPal Varga, 2020, Reliable Identification Schemes for Asset and Production Tracking in Industry 4.0 (Year: 2020).*

PCT Application No. PCT/US2022/04994, International Search Report and Written Opinion, dated May 15, 2023, 11 pages.

Singapore Patent Application No. 11202111775 S Written Opinion dated Sep. 20, 2023, 13 pages.

PCT Application No. PCT/US2020/029859, International Search Report and Written Opinion, dated Aug. 26, 2020, 11 pages.

Partial Supplementary European Search Report for European Patent Application No. 20794 790.4 dated Dec. 5, 2022, 15 pages.

\* cited by examiner

Figure 10:
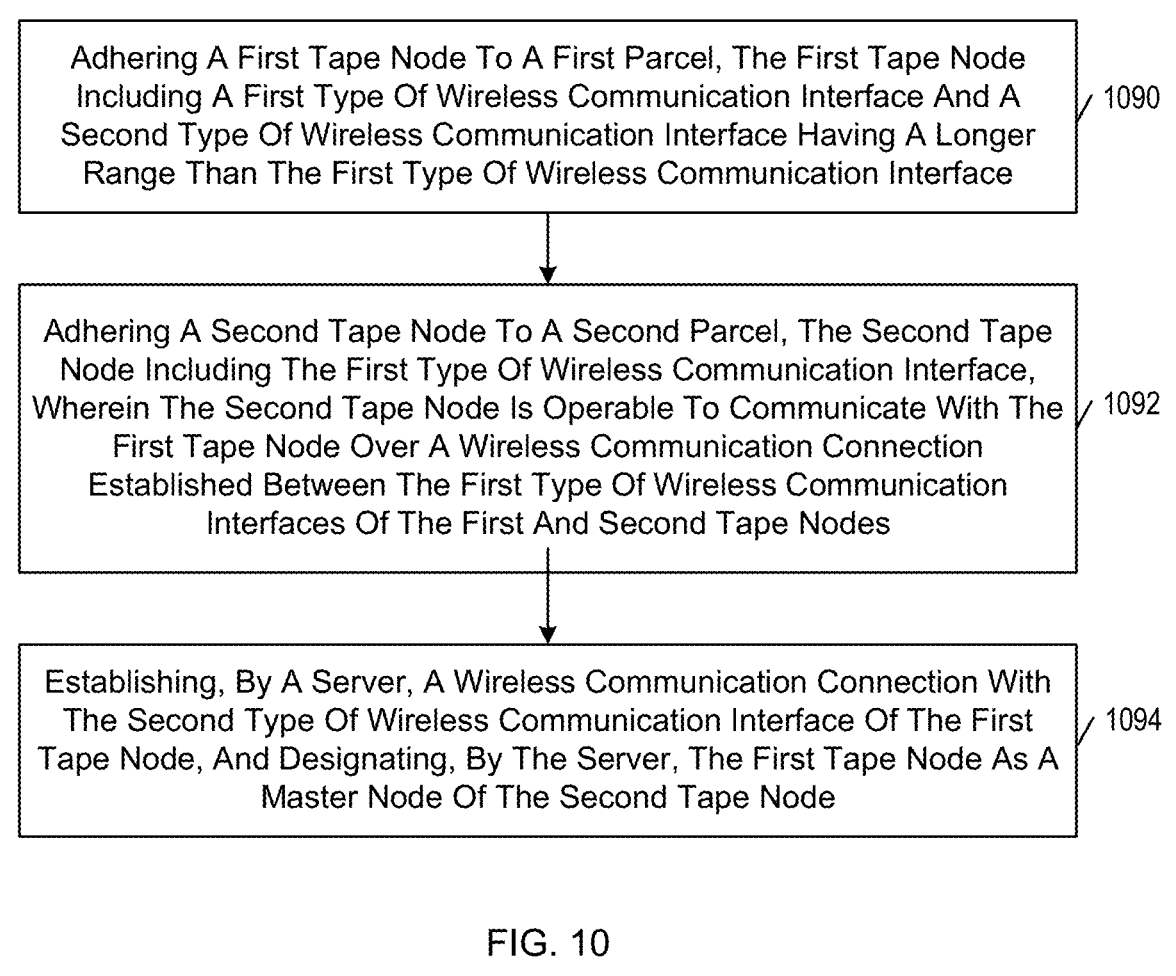

Adhering A First Tape Node To A First Parcel, The First Tape Node Including A First Type Of Wireless Communication Interface And A Second Type Of Wireless Communication Interface Having A Longer Range Than The First Type Of Wireless Communication Interface — 1090

Adhering A Second Tape Node To A Second Parcel, The Second Tape Node Including The First Type Of Wireless Communication Interface, Wherein The Second Tape Node Is Operable To Communicate With The First Tape Node Over A Wireless Communication Connection Established Between The First Type Of Wireless Communication Interfaces Of The First And Second Tape Nodes — 1092

Establishing, By A Server, A Wireless Communication Connection With The Second Type Of Wireless Communication Interface Of The First Tape Node, And Designating, By The Server, The First Tape Node As A Master Node Of The Second Tape Node — 1094

IN CASE OF FIRE EMERGENCY, DO NOT USE ELEVATOR. USE THE EXIT STAIRS.

EMERGENCY EVACUATION PLAN

1514

1800

1900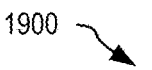

1902

RECEIVE IMAGE OF PORTION OF ENVIRONMENT LAYOUT (E.G., FLOORPLAN, PHOTOGRAPH, OR OUTDOOR ENVIRONMENTAL LAYOUT)

1904

RETRIEVE MAPPING DATA FOR GEOGRAPHIC AREA CORRESPONDING TO PORTION OF ENVIRONMENT LAYOUT, THE MAPPING DATA INCLUDING AT LEAST A PORTION OF A MAP

1906

IDENTIFY REAL LOCATIONS WITHIN THE MAPPING DATA THAT CORRESPOND TO TWO OR MORE GEOGRAPHIC FEATURES INDICATED WITHIN THE IMAGE OF THE ENVIRONMENT LAYOUT

1908

DETERMINE GEOGRAPHIC COORDINATES FOR EACH OF THE IDENTIFIED REAL LOCATIONS

1910

DETERMINE A FIRST DISTANCE BETWEEN THE TWO OR MORE REAL LOCATIONS BASED ON THE GEOGRAPHIC COORDINATES AND A SECOND DISTANCE BETWEEN THE INDICATED GEOGRAPHIC FEATURES IN THE IMAGE

1912

DETERMINE A MAP SCALE FOR THE IMAGE OF THE PORTION OF ENVIRONMENT LAYOUT

MAPPING INTERFACE

MAPPING INTERFACE

2220(2)

2204

2115(2)

2202

0                                        5M

1514

WIRELESS INFRASTRUCTURE SETUP AND ASSET TRACKING, AND METHOD THEREOF

RELATED APPLICATIONS

This application claims priority to U.S. Patent Application Ser. No. 63/279,332, titled "Improved User Interface and System for Wireless Infrastructure Setup and Asset Tracking, and Method thereof," filed Nov. 15, 2021, and incorporated herein by reference.

BACKGROUND

Graphical user interfaces for tracking systems often include maps for guiding users to an object or location. However, typical maps used may not be granular enough to be useful when the user is within a close proximity. Additionally, maps, such as those that are based on satellite imagery, or those for a large area, may not include details of indoor areas or fine details for a layout of an area. It may also be difficult to illustrate the exact location of an object or location in a graphical user interface.

SUMMARY

A user interface, method, and system thereof for mapping infrastructure nodes and locating assets in an environment is disclosed. The user interface includes a mapping interface and a locating interface. The locating interface displays locations and detection regions of wireless nodes that have performed wireless communications with an asset node attached to an asset that is being searched for.

In one embodiment, a method includes: receiving an image of at least part of an environmental layout; receiving at least two geographic feature locations associated with the image; determining at least two geographic locations each corresponding to a respective one of the at least two geographic feature locations; determining a map scale for the images based on the at least two geographic feature locations and the at least two geographic locations; and wherein the map scale allows conversion between points on the image and geographic locations.

In another embodiment, a method includes: receiving an image captured by a user device of at least part of an environmental layout; generating, based on the image, a geographic layout associated with an area depicted in the image; and outputting the geographic layout for use in a client device interface.

In another embodiment, a method includes: determining a tracking node corresponding to an asset to be found; identifying at least one infrastructure node having communicated with the tracking node; determining, for each of the at least one infrastructure node, a communication recency between the infrastructure node and the tracking node, wherein a priority order of values for the communication recency from highest to lowest is: current communication, recently communicated, and past communication; retrieving an infrastructure location for each of the at least one infrastructure node; retrieving at least part of a geographic layout based on the infrastructure location; generating a locating interface based on the at least part of the geographic layout; generating a node graphical element for each of the at least one infrastructure node, wherein a characteristic of the node graphical element is based on the communication recency;

and overlaying the node graphical element on the locating interface based on the infrastructure location.

BRIEF DESCRIPTION OF THE FIGURES

FIG. 10 is a flowchart illustrating one example method of creating a hierarchical communications network, in embodiments.

FIG. 19 is a flowchart illustrating one example method for determining a map scale for image of at least a portion of displayed environmental layout, in embodiments.

FIG. 21A is a schematic of building of FIG. 14 showing example positions for four infrastructure nodes, in embodiments.

FIG. 21B shows one example mapping display (e.g., as displayed by client device) and illustrating at least part of infrastructure data corresponding to building of FIG. 14, in embodiments.

DETAILED DESCRIPTION OF THE EMBODIMENTS

Figure 1:
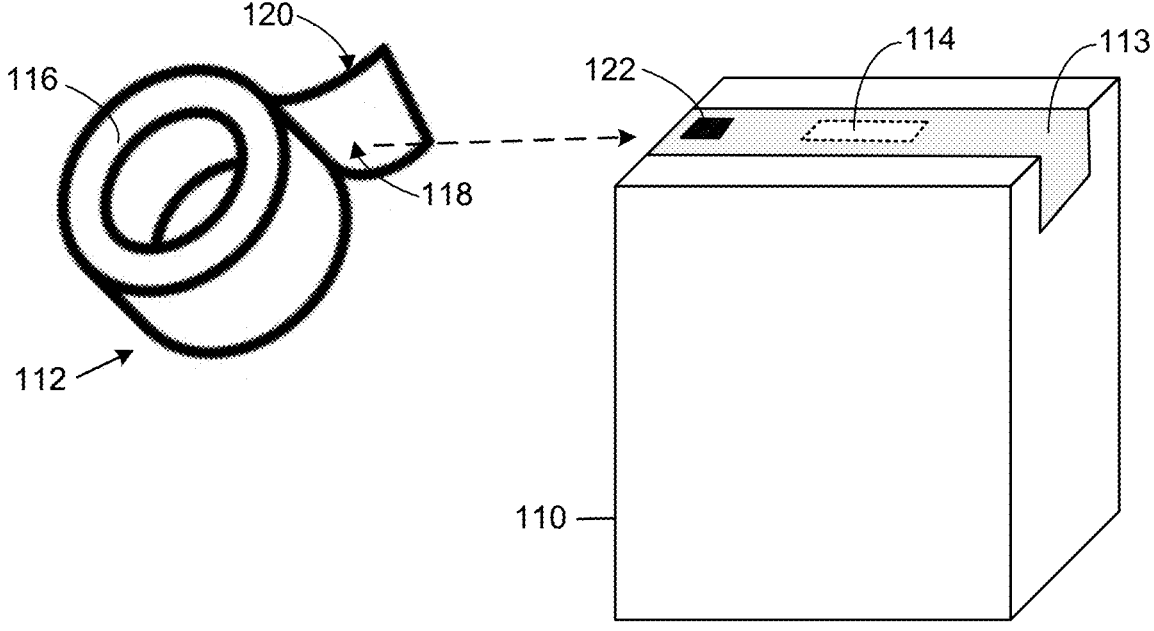
FIG. 1 is a schematic illustrating one example adhesive tape-agent platform used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication inter-
face may communicate with any electronic device imple-
menting a similar communication protocol. The communi-
cation interface protocol selected may depend on the
distance of communication between the high-power wire-
less-communication interface and a recipient, and/or a
remaining battery level of the high-power wireless-commu-
nication interface.

In some examples, a secondary agent may also include a
low-power wireless-communication interface and a tertiary
agent may also include low and medium-power wireless-
communication interfaces, as discussed below with refer-
ence to FIGS. 6A-C and/or 11A-C. Further continuing the
example, a "master agent", a "secondary agent", or a "ter-
tiary agent" may refer to a "master tape node", a "secondary
tape node", or a "tertiary tape node".

With regard to the second form of hierarchy, the "agent",
"node", "tape agent", and "tape node", may be qualified as
a parent, child, or master, depending on whether a specific
"agent" or "node" controls another "agent" or "node". For
example, a master-parent agent controls the master-child
agent and a secondary or tertiary-parent agent controls a
master-child agent. The default, without the qualifier of
"parent" or "child" is that the master agent controls the
secondary or tertiary agent Further, the "master tape node"
may control a "secondary tape node" and a "tertiary tape
node", regardless of whether the master tape node is a parent
node.

Further, each of the "agents", "nodes", "tape nodes", and
"tape agents" may be referred to as "intelligent nodes",
"intelligent tape nodes", "intelligent tape agents", and/or
"intelligent tape agents" or any variant thereof, depending
on the context and, for ease, may be used interchangeably.

Further, each of the "agents", "nodes", "tape nodes", and
"tape agents" may include flexible or non-flexible form
factors unless otherwise specified. Thus, each of the
"agents", "nodes", "tape nodes", and "tape agents" include
flexible and non-flexible (rigid) form factors, or a combina-
tion thereof including flexible components and non-flexible
components.

An adhesive tape platform includes a plurality of seg-
ments that may be separated from the adhesive product (e.g.,
by cutting, tearing, peeling, or the like) and adhesively
attached to a variety of different surfaces to inconspicuously
implement any of a wide variety of different wireless com-
munications-based network communications and transduc-
ing (e.g., sensing, actuating, etc.) applications. In certain
embodiments, each segment of an adhesive tape platform
has an energy source, wireless communication functionality,
transducing functionality (e.g., sensor and energy harvesting
functionality), and processing functionality that enable the
segment to perform one or more transducing functions and
report the results to a remote server or other computer
system directly or through a network (e.g., formed by tape
nodes and/or other network components). The components
of the adhesive tape platform are encapsulated within a
flexible adhesive structure that protects the components
from damage while maintaining the flexibility needed to
function as an adhesive tape (e.g., duct tape or a label) for
use in various applications and workflows. In addition to
single function applications, example embodiments also
include multiple transducers (e.g., sensing and/or actuating
transducers) that extend the utility of the platform by, for
example, providing supplemental information and function-
ality relating characteristics of the state and/or environment
of, for example, an article, object, vehicle, or person, over
time.

Systems and processes for fabricating flexible multifunc-
tion adhesive tape platforms in efficient and low-cost ways
also are described in US Patent Application Publication No.
US-2018-0165568-A1. For example, in addition to using
roll-to-roll and/or sheet-to-sheet manufacturing techniques,
the fabrication systems and processes are configured to
optimize the placement and integration of components
within the flexible adhesive structure to achieve high flex-
ibility and ruggedness. These fabrication systems and pro-
cesses are able to create useful and reliable adhesive tape
platforms that may provide local sensing, wireless transmit-
ting, and positioning functionalities. Such functionality
together with the low cost of production is expected to
encourage the ubiquitous deployment of adhesive tape plat-
form segments and thereby alleviate at least some of the
problems arising from gaps in conventional infrastructure
coverage that prevent continuous monitoring, event detec-
tion, security, tracking, and other logistics applications
across heterogeneous environments.

As used herein, the term "or" refers an inclusive "or"
rather than an exclusive "or." In addition, the articles "a" and
"an" as used in the specification and claims mean "one or
more" unless specified otherwise or clear from the context to
refer the singular form.

The terms "module," "manager," "component", and
"unit" refer to hardware, software, or firmware, or a com-
bination thereof. The term "processor" or "computer" or the
like includes one or more of: a microprocessor with one or
more central processing unit (CPU) cores, a graphics pro-
cessing unit (GPU), a digital signal processor (DSP), a
field-programmable gate array (FPGA), a system-on-chip
(SoC), a microcontroller unit (MCU), and an application-
specific integrated circuit (ASIC), a memory controller, bus
controller, and other components that manage data flow
between said processor associated memory, and other com-
ponents communicably coupled to the system bus. Thus the
terms "module," "manager," "component", and "unit" may
include computer readable instructions that, when executed
by a processor, implement the functionality discussed herein
with respect to said "module," "manager," "component",
and "unit".

Adhesive Tape Agent Platform

FIG. 1 is a schematic illustrating one example adhesive
tape-agent platform 112, including wireless transducing
circuit 114, used to seal a package 110 for shipment. In this
example, a segment 113 of the adhesive tape-agent platform
112 is dispensed from a roll 116 and affixed to the package
110. The adhesive tape-agent platform 112 includes an
adhesive side 118 and a non-adhesive surface 120. The
adhesive tape-agent platform 112 may be dispensed from the
roll 116 in the same way as any conventional packing tape,
shipping tape, or duct tape. For example, the adhesive
tape-agent platform 112 may be dispensed from the roll 116
by hand, laid across the seam where the two top flaps of the
package 110 meet, and cut to a suitable length either by hand
or using a cutting instrument (e.g., scissors or an automated
or manual tape dispenser). Examples of such tape agents
include tape agents having non-adhesive surface 120 that
carry one or more coatings or layers (e.g., colored, light
reflective, light absorbing, and/or light emitting coatings or
layers). Further, the segment 113 may include an identifier
122 (e.g., a QR code, RFID chip, etc.) that may be used to
associate the segment 113 with the package 110, as dis-
cussed below.

Figure 2:
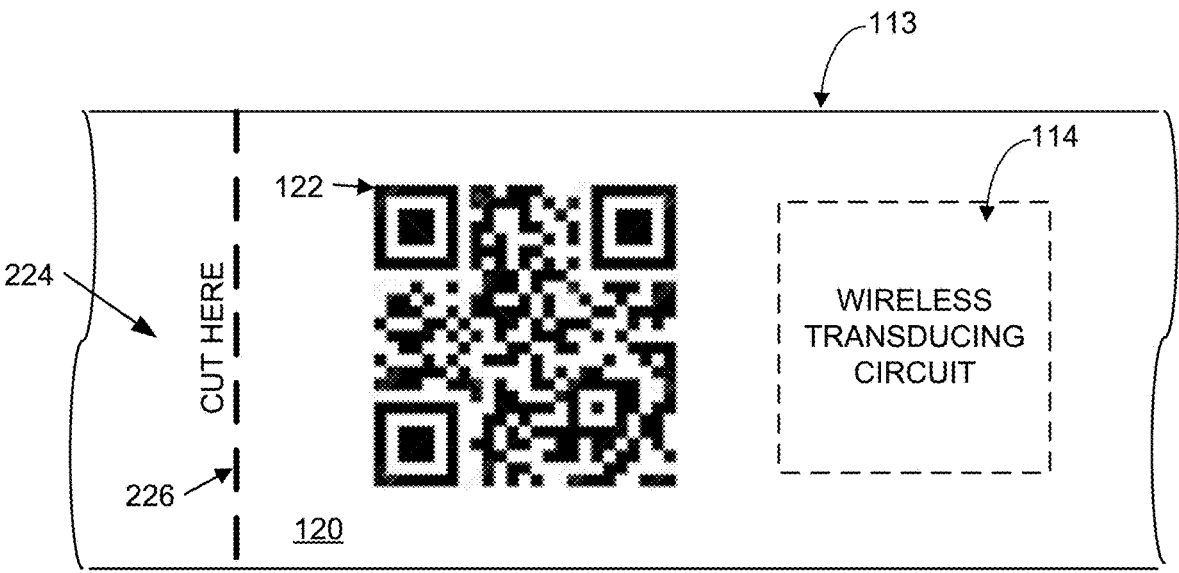
FIG. 2 is a schematic illustrating a non-adhesive surface of a segment of the adhesive tape agent platform of FIG. 1, in embodiments.

FIG. 2 is a schematic illustrating a non-adhesive surface
120 of the segment 113 of the adhesive tape agent platform
112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
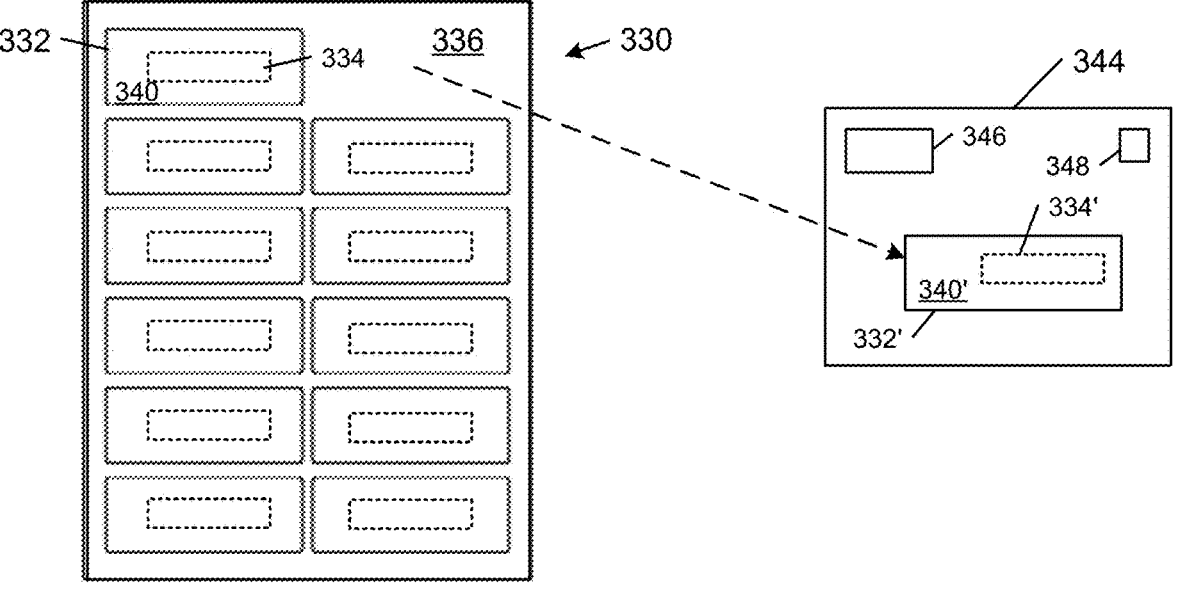
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
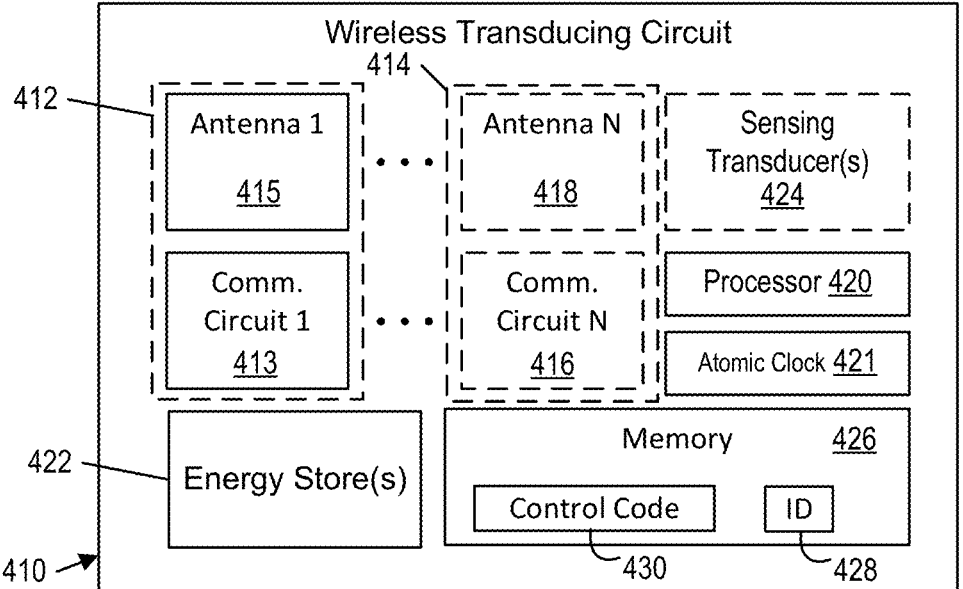
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
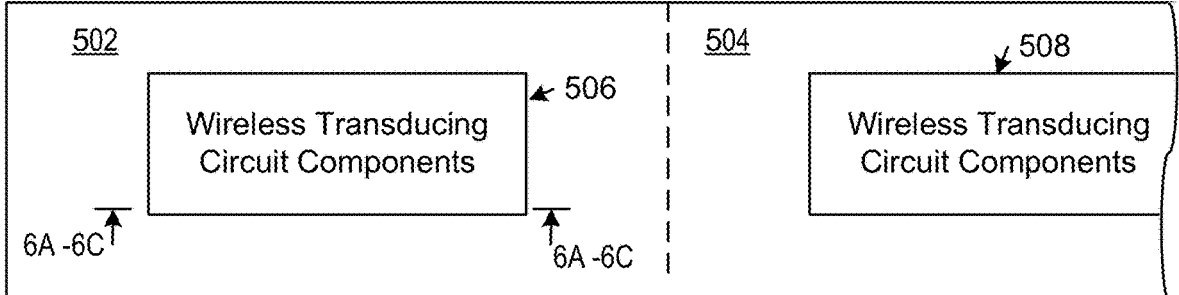
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
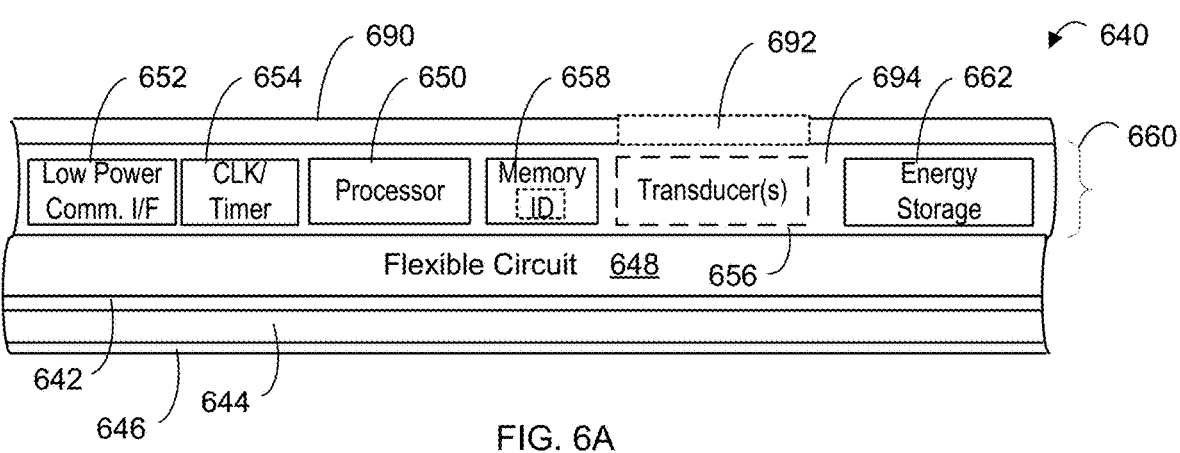
FIGS. 6A-C are schematic diagrams illustrating cross-sectional side views of portions of example segments of three types of flexible adhesive tape agent platforms, in embodiments.
Figure 6B:
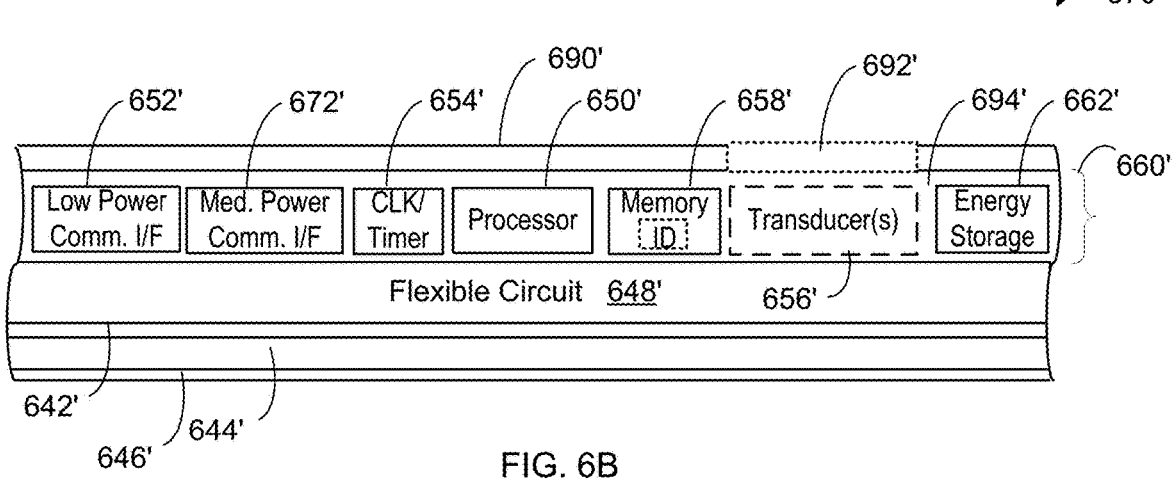
Figure 6C:
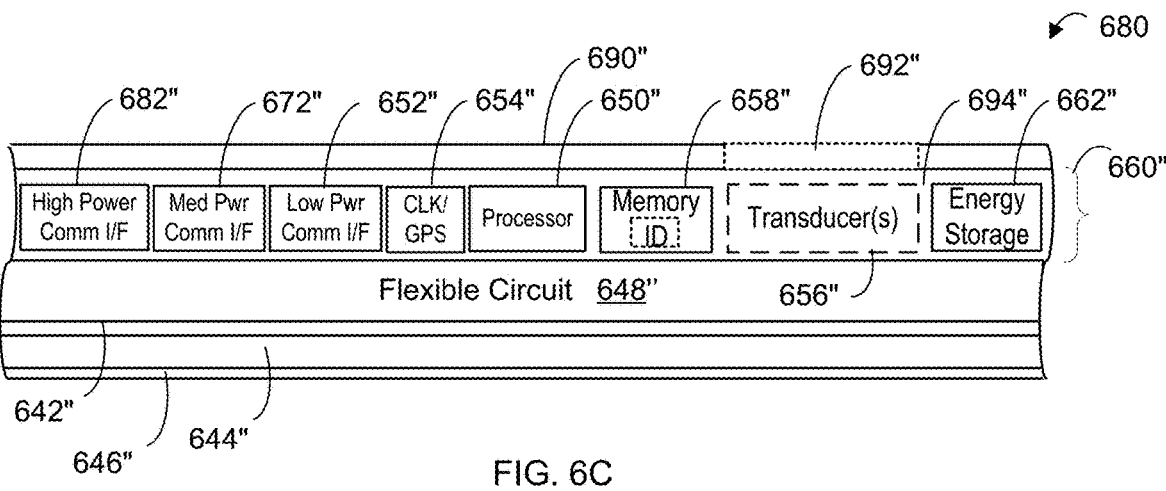
Figure 7A:
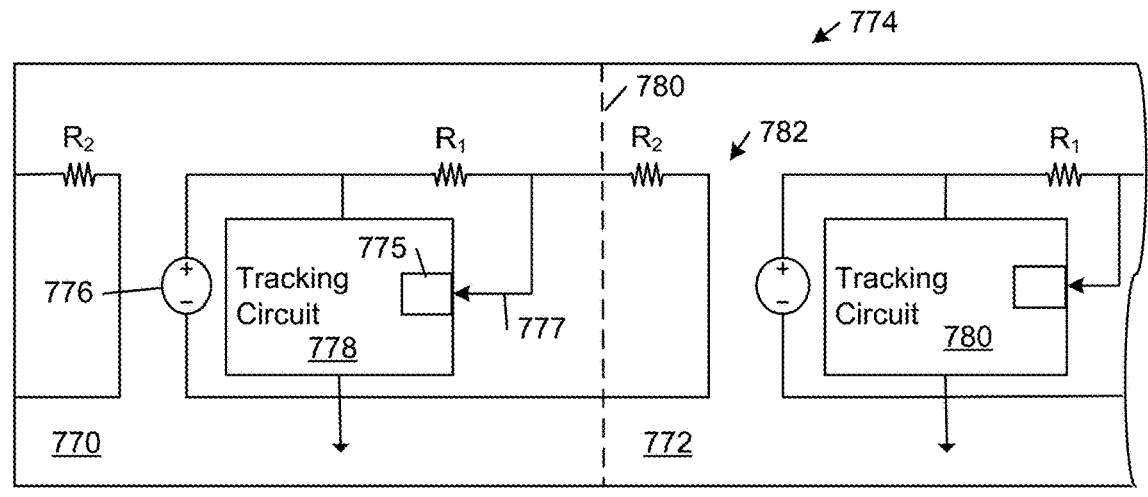
FIG. 7A is a schematic diagram illustrating an adhesive tracking product with a first example wake circuit that delivers power from an energy source to the tracking circuit in response to an event, in embodiments.
Figure 7B:
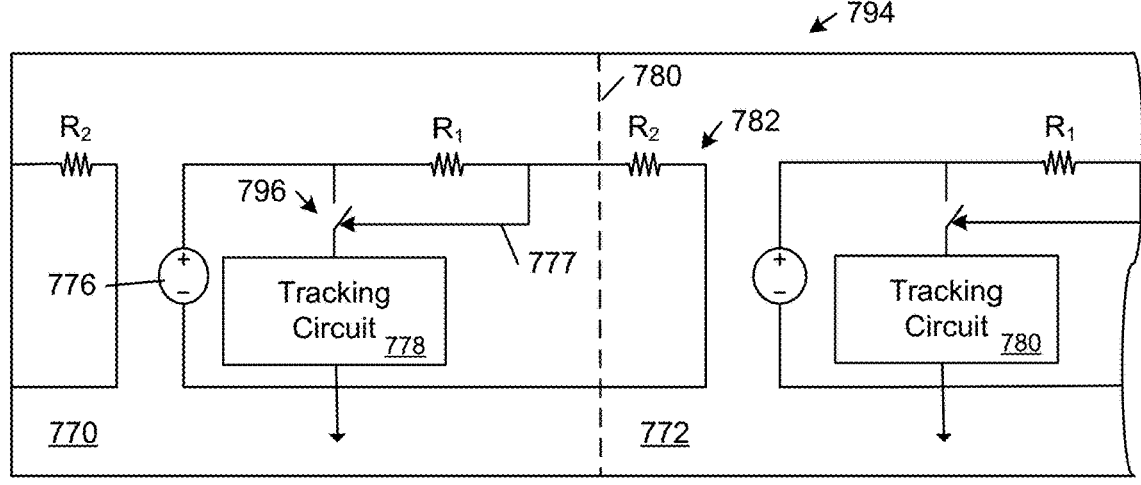
FIG. 7B is a schematic diagram illustrating an adhesive tracking product with a second example wake circuit that delivers power from an energy source to the tracking circuit in response to an event.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 7C:
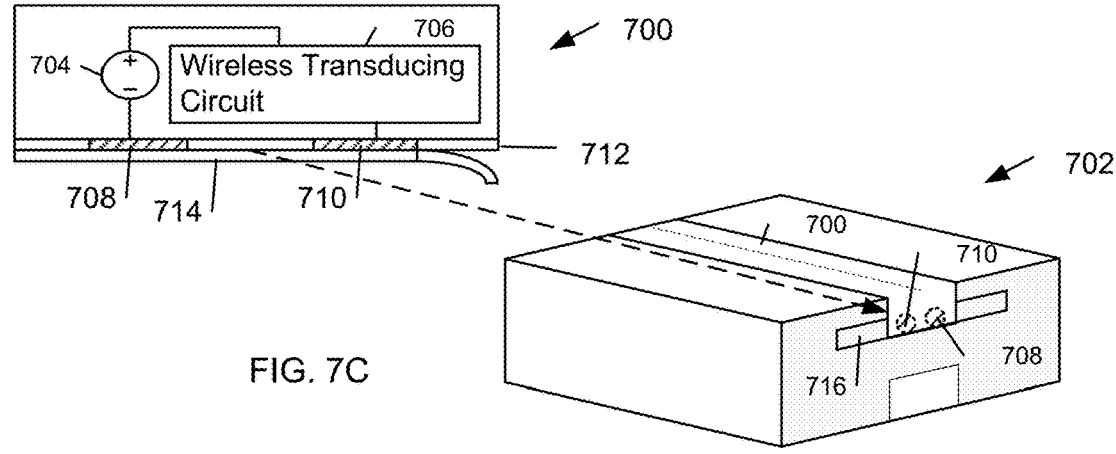
FIG. 7C is a diagrammatic cross-sectional front view of an example adhesive tape platform and a perspective view of an example asset, in embodiments.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 704 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
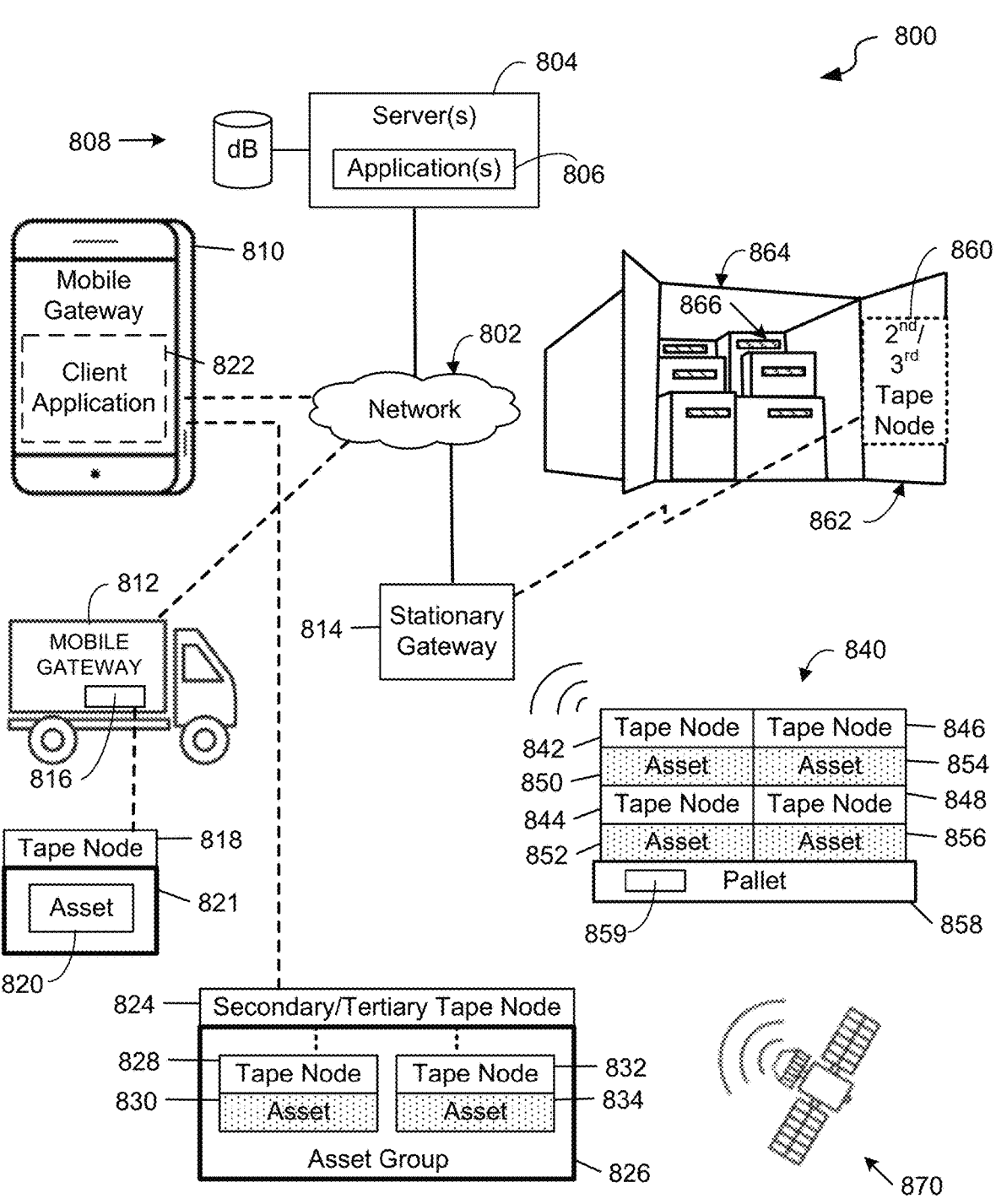
FIG. 8 is a schematic illustrating an example network communications environment that includes a network supporting communications between servers, mobile gateways, a stationary gateway, and various types of tape nodes associated with various assets, in embodiments.

FIG. 8 shows an example network communications environment 800 that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-7; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., a master agent, a secondary agent, or a tertiary agent), where each tape node class has a different respective set of functionalities and/or capacities, as described herein with respect to the "agents" in FIGS. 1-7. For example, the master agents have a lower-power wireless communication interface (e.g., the low-power wireless-communication interface 652, with reference to FIG. 6), in comparison to the secondary and tertiary agents.

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of a shipping container 864, and is further configured to communicate with the network service 808 over the network 802. In the illustrated example, the shipping container 864 contains a number of parcels labeled or sealed by respective master tape nodes 866 and containing respective assets. The secondary or tertiary tape node 860 communicates with each of the master tape nodes 866 within the shipping container 864 and communicates with the stationary gateway 814. In some examples, each of the master tape nodes 866 includes a low-power wireless communications-interface (e.g., the low-power wireless-communication interface 652, 652', 652", with reference to FIGS. 6A-6C), and the secondary or tertiary tape node 860 includes a low-power wireless-communications interface (low-power wireless-communication interfaces 652', 652", with reference to FIGS. 6B-6C) for communicating with the master tape nodes 866 contained within the shipping container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the shipping container 864 are closed, the secondary or tertiary tape node 860 is operable to communicate wirelessly with the master tape nodes 866 contained within the shipping container 864. In some embodiments, both a secondary and a tertiary node are attached to the shipping container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the shipping container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-7). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 826 and a shipping container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
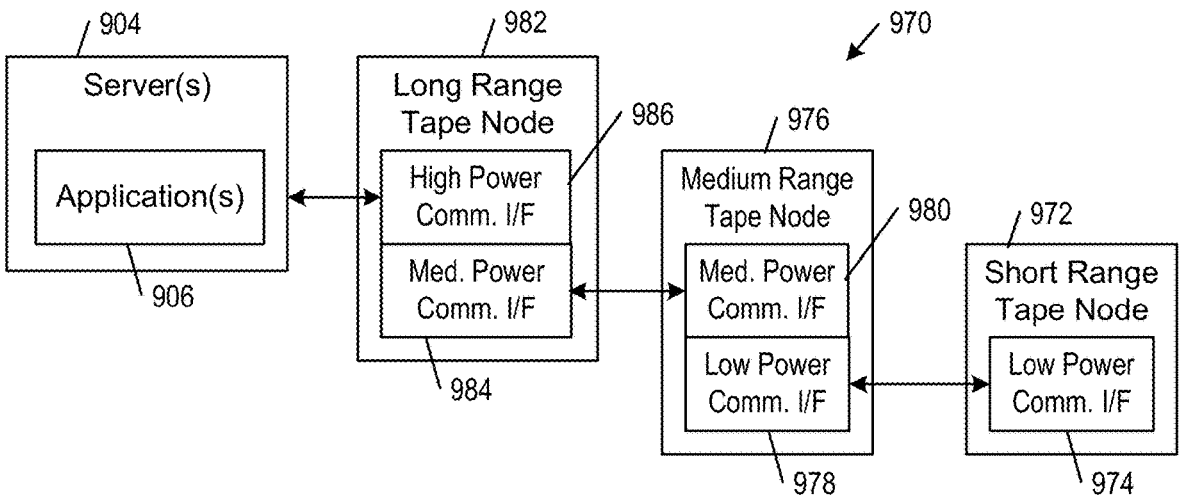
FIG. 9 is a schematic illustrating one example hierarchical wireless communications network of tape nodes, in embodiments.

FIG. 9 is a schematic illustrating one example hierarchical wireless communications network of tape nodes 970. In this example, the short-range tape node 972 and the medium range tape node 976 communicate with one another over their respective low power wireless communication interfaces 974, 978. The medium range tape node 976 and the long-range tape node 982 communicate with one another over their respective medium power wireless communication interfaces 980, 984. The long-range tape node 982 and the one or more network service servers 904 (e.g., server(s) 804, FIG. 8) running application(s) 906 (e.g., application(s) 806) communicate with one another over the high-power communication interface 986. In some examples, the low power communication interfaces 974, 978 establish wireless communications with one another in accordance with the Bluetooth LE protocol, the medium power communication interfaces 980, 984 establish wireless communications with one another in accordance with the LoRa communications protocol, and the high-power communication interface 986 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 904. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 904/804.

FIG. 10 is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
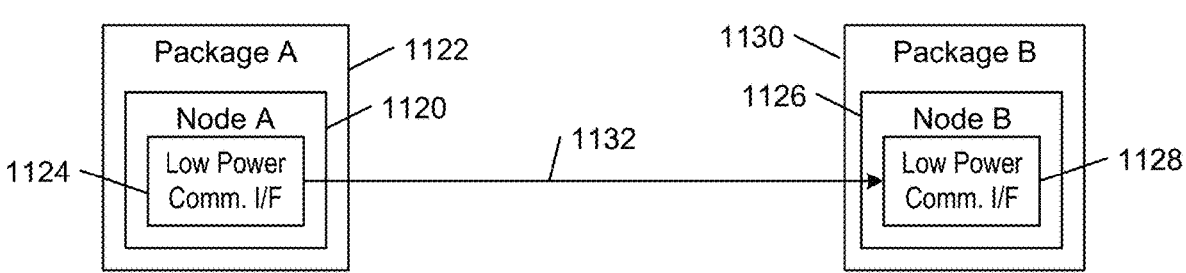
FIG. 11A shows a node (Node A) associated with a package (Package A), in embodiments.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
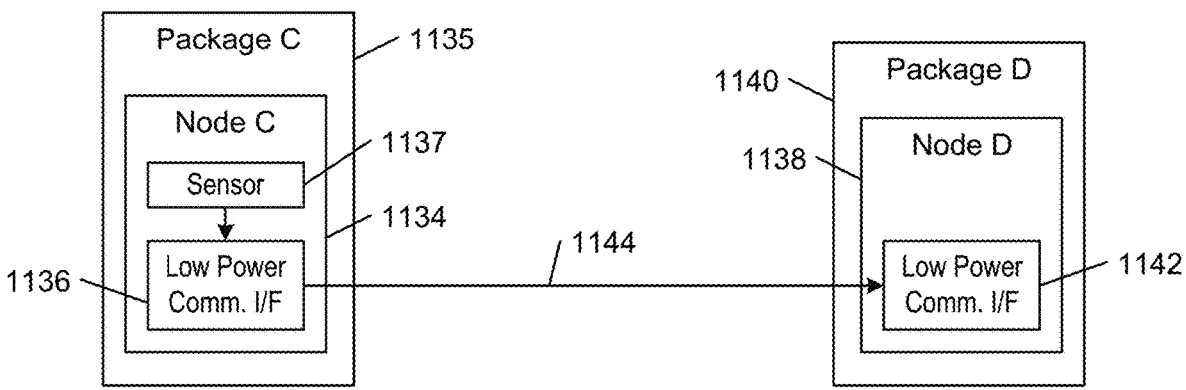
FIG. 11B shows a node (Node C) associated with a package (Package C), in embodiments.

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
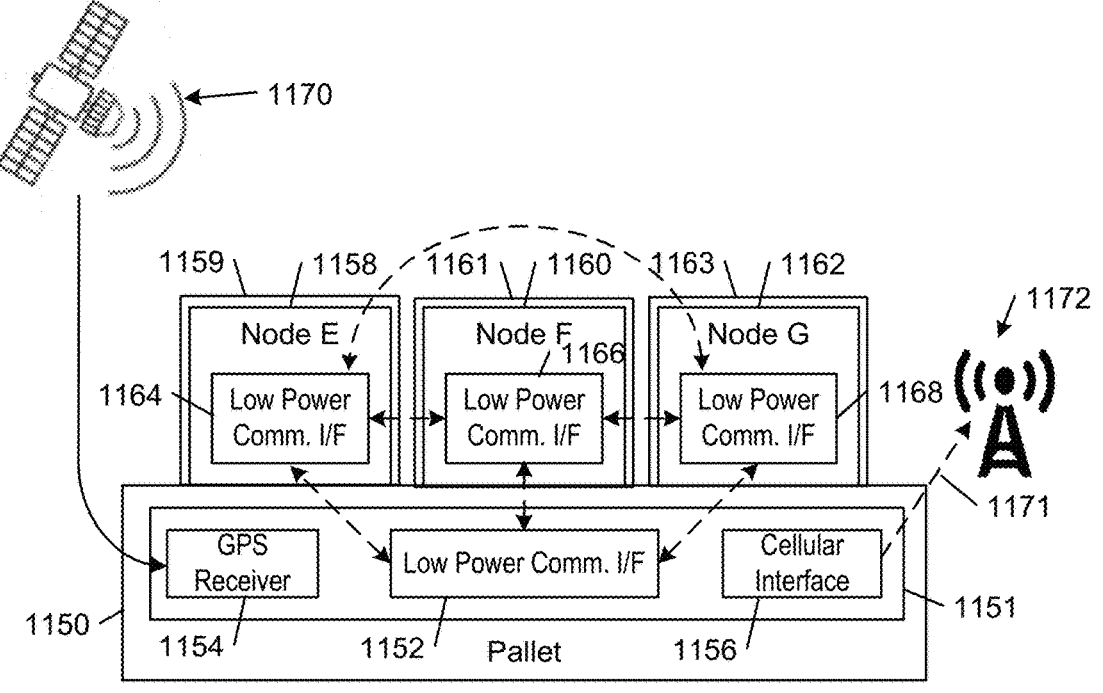
FIG. 11C shows a pallet associated with a master node that includes a low-power communications interface, a GPS receiver, and a cellular communications interface, in embodiments.

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 12:
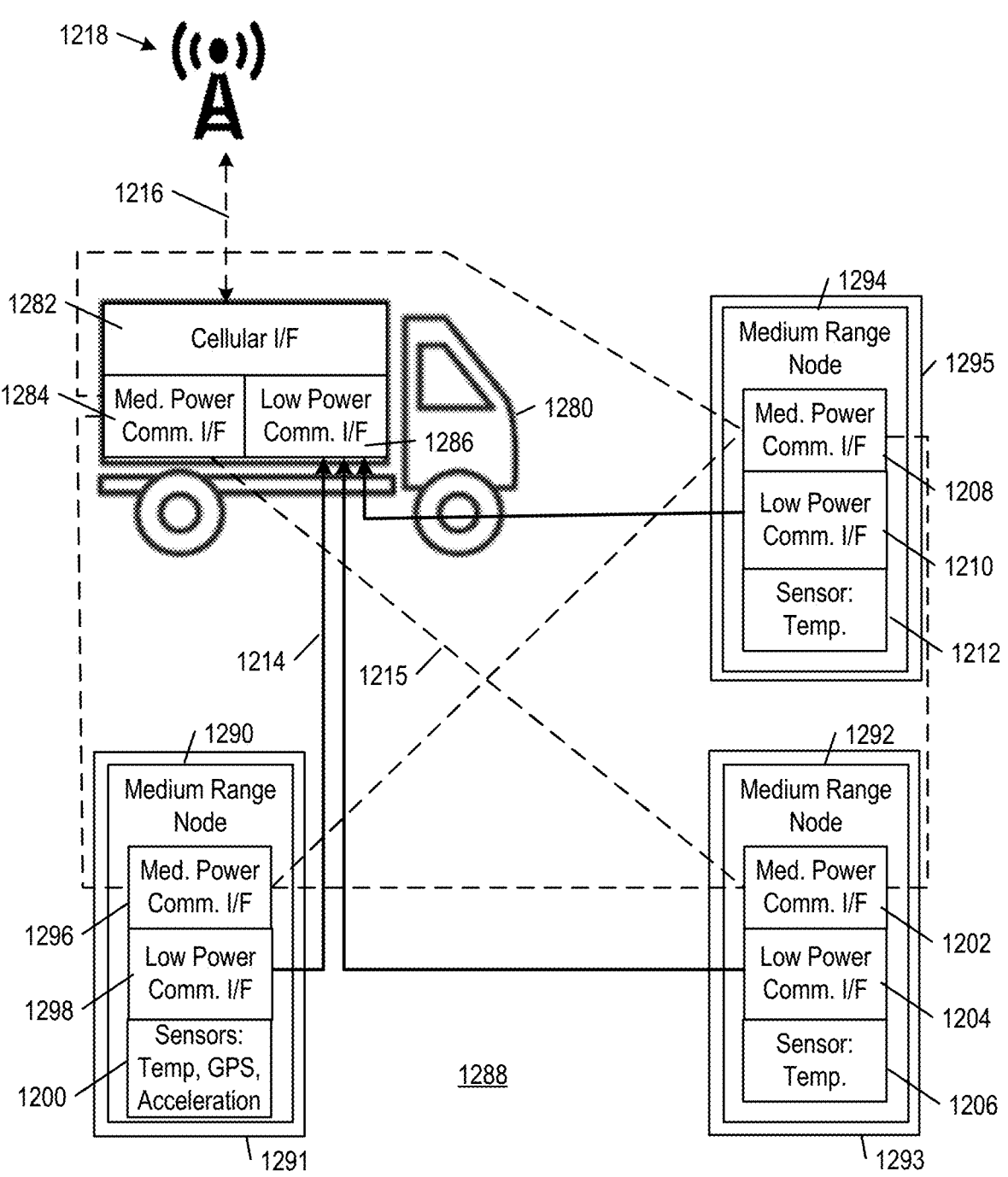
FIG. 12 is a schematic illustrating a truck configured as a mobile node, or mobile hub, with a cellular communications interface, a medium-power communications interface, and a low power communications interface, in embodiments.

FIG. 12 is a schematic illustrating a truck 1280 configured as a mobile node or mobile hub that includes a cellular communications interface 1282, a medium-power communications interface 1284, and a low power communications interface 1286. The communications interfaces 1280-1286 may be implemented on one or more tape and non-tape nodes. In an illustrative scenario, the truck 1280 visits a logistic storage facility, such as a warehouse 1288, to wirelessly obtain temperature data generated by temperature sensors in the medium range nodes 1290, 1292, 1294. The warehouse 1288 contains nodes 1290, 1292, and 1294 that are associated with respective logistic containers 1291, 1293, 1295. In the illustrated embodiment, each node 1290-1294 is a medium range node that includes a respective medium power communications interface 1296, 1202, 1208, a respective low power communications interface 1298, 1204, 1210 and one or more respective sensors 1200, 1206, 1212. In the illustrated embodiment, each of the package nodes 1290, 1292, 1294 and the truck 1280 is connected to each of the other ones of the package nodes through a respective medium power communications path (shown by dashed lines). In some embodiments, the medium power communications paths are LoRa formatted communication paths.

In some embodiments, the communications interfaces 1284 and 1286 (e.g., a LoRa communications interface and a Bluetooth Low Energy communications interface) on the node on the truck 1280 is programmed to broadcast advertisement packets to establish connections with other network nodes within range of the truck node. A warehouse 1288 includes medium range nodes 1290, 1292, 1294 that are associated with respective logistic containers 1291, 1293, 1295 (e.g., packages, boxes, pallets, and the like). When the truck node's low power interface 1286 is within range of any of the medium range nodes 1290, 1292, 1294 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1290, 1292, 1294, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1214 or a LoRa formatted communication path 1217), the truck node determines the identity information for the medium range node 1290 (e.g., a peripheral node), the medium range node's capabilities include retrieving temperature data, and the medium range node's services include transmitting temperature data to other nodes. Depending of the size of the warehouse 1288, the truck 1280 initially may communicate with the nodes 1290, 1292, 1294 using a low power communications interface (e.g., Bluetooth Low Energy interface). If any of the anticipated nodes fails to respond to repeated broadcasts of advertising packets by the truck 1280, the truck 1280 will try to communicate with the non-responsive nodes using a medium power communications interface (e.g., LoRa interface). In response to a request from the medium-power communication interface 1284, the medium range node 1290 transmits an indication of its measured temperature data to the truck node. The truck node repeats the process for each of the other medium range nodes 1292, 1294 that generate temperature measurement data in the warehouse 1288. The truck node reports the collected (and optionally processed, either by the medium range nodes 1290, 1292, 1294 or the truck node) temperature data to a server over a cellular communication path 1216 with a cellular network 1218.

Figure 13:
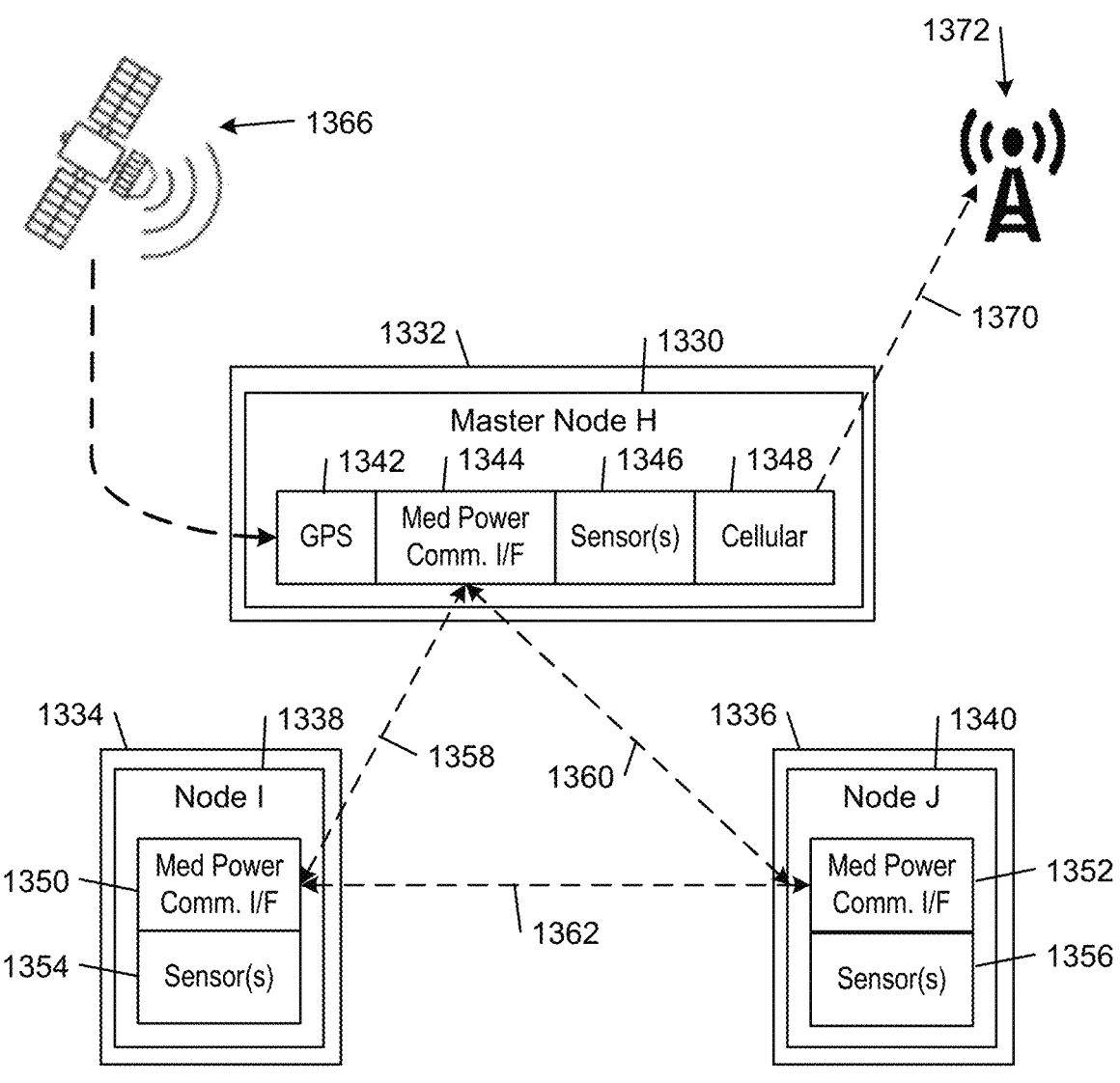
FIG. 13 is a schematic illustrating a master node associated with a logistic item that is grouped together with other logistic items associated with peripheral nodes, in embodiments.

FIG. 13 is a schematic illustrating a master node 1330 is associated with a logistic item 1332 (e.g., a package) and grouped together with other logistic items 1334, 1336 (e.g., packages) that are associated with respective peripheral nodes 1338, 1340. The master node 1330 includes a GPS receiver 1342, a medium power communications interface 1344, one or more sensors 1346, and a cellular communications interface 1348. Each of the peripheral nodes 1338, 1340 includes a respective medium power communications interface 1350, 1352 and one or more respective sensors 1354, 1356. In the illustrated embodiment, the peripheral and master nodes are connected to one another other over respective pairwise communications paths (shown by dashed lines). In some embodiments, the nodes 1330, 1338, 1340 communicate through respective LoRa communications interfaces over LoRa formatted communications paths 1358, 1360, 1362.

In the illustrated embodiment, the master and peripheral nodes 1330, 1338, 1340 include environmental sensors for obtaining information regarding environmental conditions in the vicinity of the associated logistic items 1332, 1334, 1336. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1330 periodically broadcasts advertising packets in the surrounding area. When the peripheral nodes 1338, 1340 are within range of master node 1330, and are operating in a listening mode, the peripheral nodes 1338, 1340 will extract the address of master node 1330 and potentially other information (e.g., security information) from the advertising packets. If, according to their respective programmatic code, the peripheral nodes 1338, 1340 determine that they are authorized to connect to the master node 1330, the peripheral nodes 1338, 1340 will attempt to pair with the master node 1330. In this process, the peripheral nodes 1338, 1340 and the master node 1330 determine each other's identities, capabilities, and services. For example, after successfully establishing a respective communication path 1358, 1360 with each of the peripheral nodes 1338, 1340 (e.g., a LoRa formatted communication path), the master node 1330 determines certain information about the peripheral nodes 1338, 1340, such as their identity information (e.g., peripheral nodes), their capabilities (e.g., measuring temperature data), and their services include transmitting temperature data to other nodes.

After establishing LoRa formatted communications paths 1358, 1360 with the peripheral nodes 1338, 1340, the master node 1330 transmits requests for the peripheral nodes 1338, 1340 to transmit their measured and/or locally processed temperature data to the master node 1330.

In the illustrated embodiment, the master node 1330 can determine its own location based on geolocation data transmitted by a satellite-based radio navigation system 1366 (e.g., GPS, GLONASS, and NAVSTAR) and received by the GPS receiver 1342 component of the master node 1330. In an alternative embodiment, the location of the master node 1330 can be determined using cellular based navigation techniques that use mobile communication technologies (e.g., GSM, GPRS, CDMA, etc.) to implement one or more cell-based localization techniques. After the master node 1330 has ascertained its location, the distance of each of the logistic items 1334, 1336 from the master node 1330 can be estimated based on the average signal strength of the advertising packets that the master node 1330 receives from the respective peripheral node. The master node 1330 can then transmit its own location and the locations of the package nodes H, J, and I to a server over a cellular interface connection with a cellular network 1372. Other methods of determining the distance of each of the logistic items 1334, 1336 from the master node 1330, such as Received Signal-Strength Index (RSSI) based indoor localization techniques, also may be used.

In some embodiments, after determining its own location and the locations of the peripheral nodes, the master node 1330 reports the location data, the collected and optionally processed (e.g., either by the peripheral nodes peripheral nodes 1338, 1340 or the master node 1330) sensor data to a server over a cellular communication path 1370 on a cellular network 1372.

Improved User Interface and System for Wireless Tracking System

A setup process for infrastructure of a wireless tracking system is described in further detail in U.S. Pat. No. 11,281, 958, filed on Apr. 24, 2020, titled "Wireless Sensor Networks Installation, Deployment, Maintenance, and Operation," incorporated herein by reference in its entirety.

One aspect of the present embodiments includes the realization that when configurating a wireless tracking system, such as by installing infrastructure nodes within and around a building or structure, it is important to define each location of the infrastructure nodes as accurately as possible. However, there is often no available environmental layout (e.g., an internal layout of an environment such as a floorplan) on which to digitally mark the locations. The present embodiments solve this problem by allowing a user to create a new environmental layout from an image of a floorplan or operational area.

Another aspect of the present embodiments includes the realization that it is useful to show infrastructure nodes on an environmental layout when searching for a tracking node attached to an asset. Particularly, locations defined by coordinates may not be easily interpreted and intuitively understood by the user, whereas an environmental layout (e.g., a floorplan, site plan, map, aerial photograph, etc.) showing infrastructure nodes that have contact with, or had had recent contact with, a lost asset, are invaluable for quickly identifying the location of the lost asset. For example, a client user interface that provides a map (e.g., plan, floorplan, site plan) of a relevant area, populating the map with locations of infrastructure nodes, and then defining the location of the lost assets in the mapped area provides fast assimilation by the user and thereby fast recovery of the lost asset.

Creating an Environmental Layout from an Image

An image of at least a portion of an environmental layout (e.g., a floorplan, site plan, plat map, aerial image, or other drawing/diagram/photograph that shows relationship between features of a given area, preferably as viewed from above.) is uploaded to the wireless tracking system's database and processed to create a map of the local environment for use in the client user interface. A scale of the environmental layout within the image is determined based on a retrieved portion of a geographic map that corresponds to the area of the environmental layout.

FIGS. 14-17 are schematic diagrams showing one example process of uploading an image of a portion of an environmental layout to a tracking system database for use in mapping and locating user interfaces (e.g., a client user interface), according to some embodiments. These figures may be viewed together with the following description.

Figure 14:
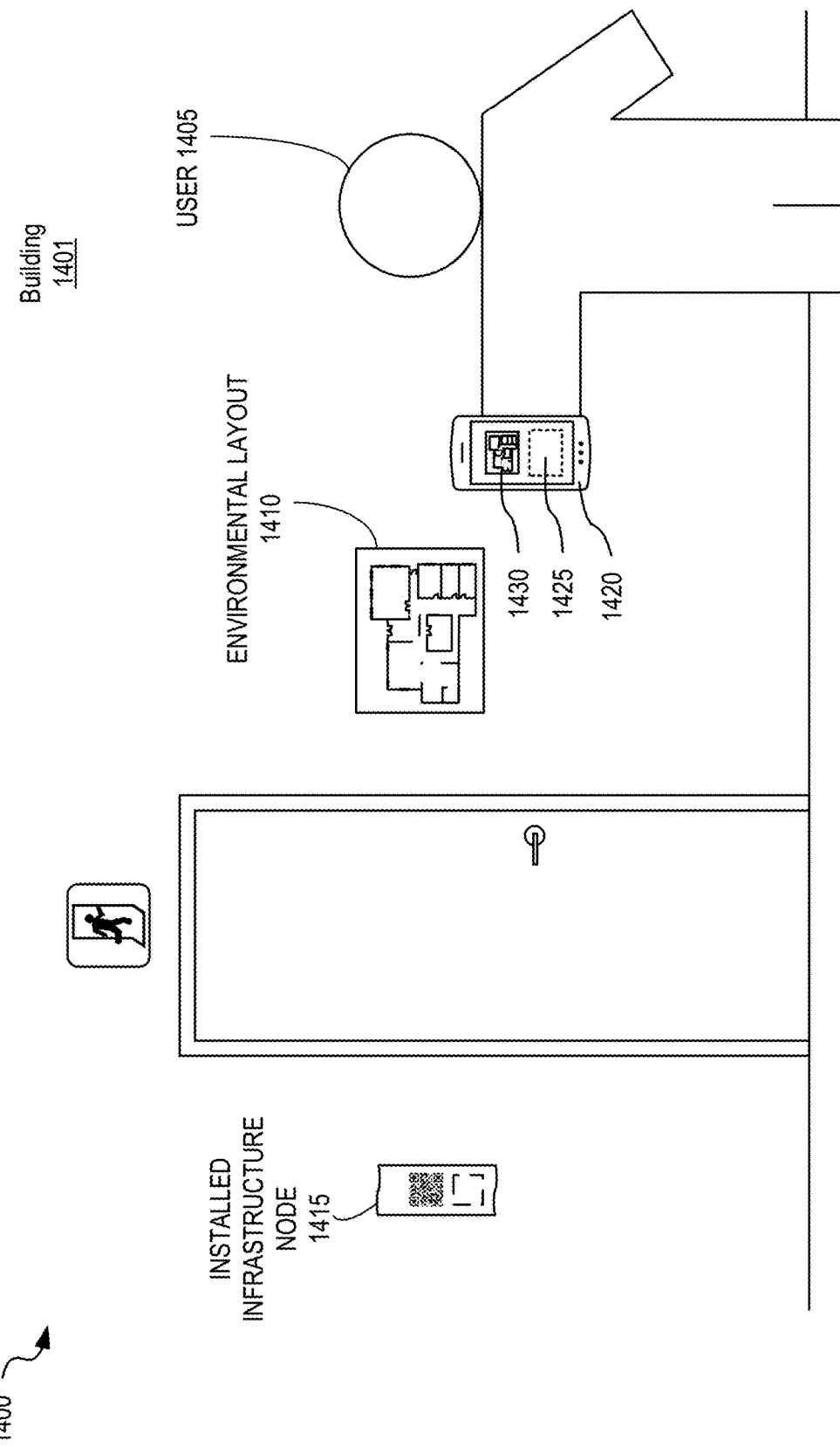
FIGS. 14-17 are schematic diagrams showing one example process of uploading an image of a portion of an environmental layout to a tracking system database for use in mapping and locating user interfaces, according to some embodiments.

FIG. 14 shows one example scenario 1400 where a user 1405 uses a client device 1420 (e.g., a smartphone, tablet, laptop computer, or similar computing device) to capture an image 1430 (e.g., using a camera of client device 1420) of a displayed environmental layout 1410 (e.g., an emergency floorplan) within a building 1401. In certain scenarios, user 1405 may obtain image 1430 from other sources, such as web sites, public databases, etc. Although shown as a floorplan of a building, image 1430 may represent an environmental layout of other operational areas, such as a yard, a parking lot, a parking garage, an outdoor storage yard, a shipyard, a shipping dock, a port, an airport, an outdoor park, an exterior of a building, a warehouse, a storage facility, a storage lot, etc. In certain embodiments, image 1430 is a photograph of the operational area, preferably from an overhead perspective. In scenario 1400, at least one infrastructure node 1415 of a wireless tracking system (e.g., wireless tracking system 800 of FIG. 8) is being installed within building 1401. As described above, a gateway node (e.g., mobile gateways 810 and 812, and stationary gateway node 814 of FIG. 8) is a wireless node that includes more than one wireless communication interface for bridging communications across devices that use different wireless communications interfaces/protocols. For example, a gateway node may include two or more of Bluetooth, BLE, LoRa, LoRaWAN, Zigbee, Cellular (4G, LTE, 5G, etc.), Satellite, GPS, Wi-Fi communications interfaces. The gateway node may be a flexible adhesive tape platform, another flexible electronic device, a non-flexible electronic device, a device that is battery powered, a device that is line-powered, some other type of electronic wireless communication device, a client device, a smartphone, or some combination thereof. An infrastructure node may be, in embodiments, a gateway node that is generally in a fixed location. For example, the infrastructure node may be line-powered or integrated into the infrastructure of a building, area, or site, in some embodiments. In certain embodiments, the infrastructure node is an adhesive tape platform that is attached to an object or part of an area that does not move.

In embodiments, client device 1420 runs an app 1425 associated with the wireless tracking system that instructs the user on capturing image 1430. Displayed environmental layout 1410 may show emergency exits, exit routes, exit stairways, etc., such as displayed in corridors and stairwells to provide safety information to occupants of building 1401. Accordingly, displayed environmental layout 1410 may be readily available when installing infrastructure node 1415 within building 1401. In certain cases, displayed environmental layout 1410 is a partial floorplan of a portion of building 1401 local to where the displayed partial floorplan is mounted.

When installing infrastructure node 1415 into an existing wireless tracking network (e.g., adding infrastructure node 1415 as a new node in a wireless tracking system), the wireless tracking system may already have a mapped environmental layout of building 1401. However, in certain circumstances, such as where infrastructure node 1415 is being installed in a new wireless tracking system installation for building 1401, a mapped environmental layout may not be readily available. App 1425 may provide a client user interface that instructs user 1405 to capture image 1430 of displayed environmental layout 1410 when installing infrastructure node 1415. This instruction may be triggered when a location of the infrastructure node 1415 to be installed, or a location of the client device 1420, does not correspond to a previously registered environmental layout 1410. Advantageously, through use of client device 1420 and app 1425, installation of infrastructure node 1415 within building 1401 is simplified since user 1405 may capture image 1430 for processing by the wireless tacking system to generate a geographic layout (see geographic layout 1704, FIG. 17) for building 1401, as described in detail below.

Figure 15:
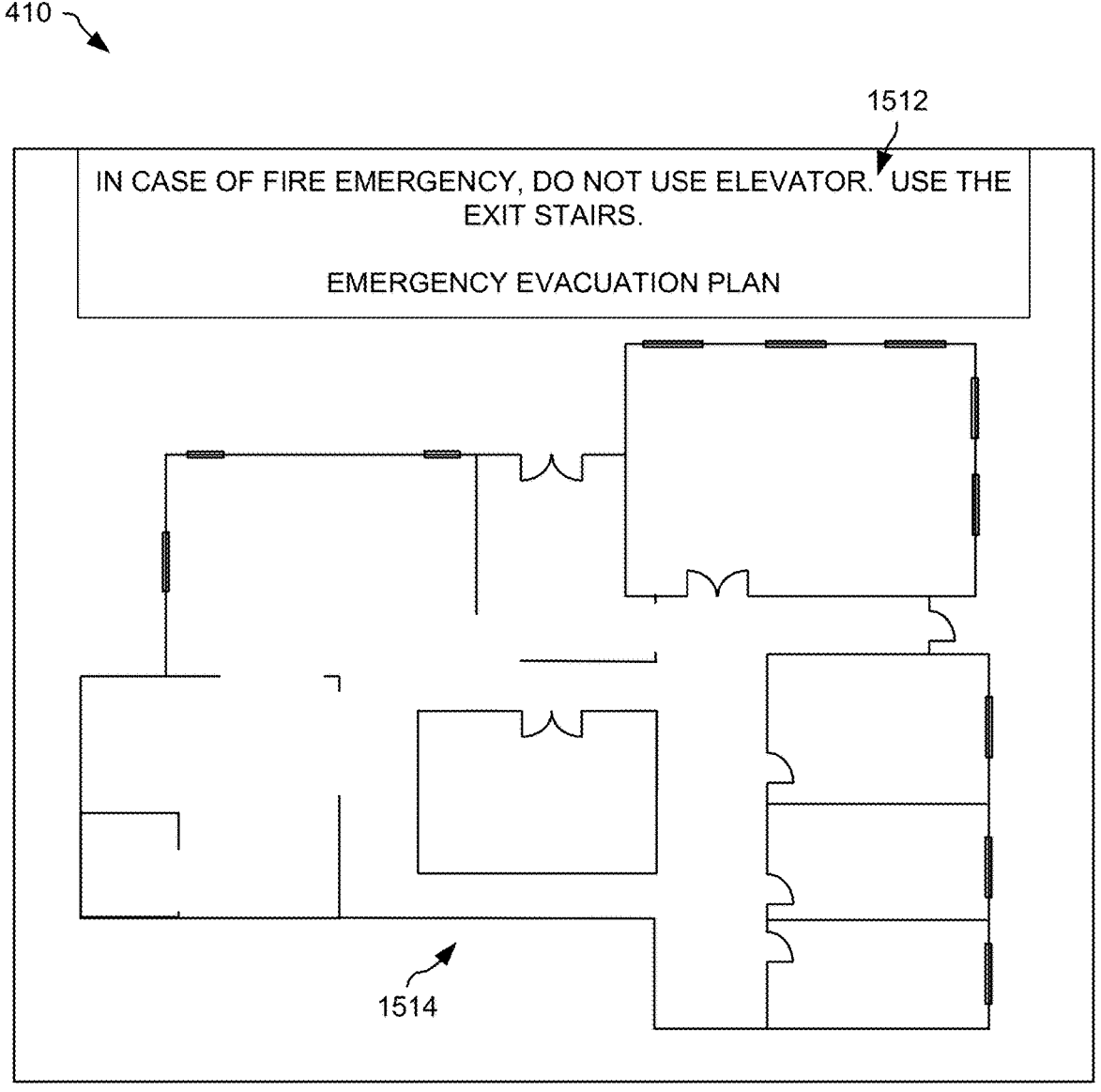

FIG. 15 shows displayed environmental layout 1410 in further example detail including emergency evacuation instructions 1512 and at least a partial environmental layout 1514. In certain situations, environmental layout 1514 may represent one entire floor of building 1401. In other situations, environmental layout 1514 may represent a portion of one floor of building 1401.

Since the wireless tracking system tracks location of wireless tracking devices (e.g., wireless nodes attached to assets) relative to geographic coordinates (e.g., latitude and longitude), location of infrastructure node 1415 is also defined using geographic coordinates. Accordingly, maps used within the wireless tracking system are geographic maps. That is, for displayed environmental layout 1410 to be effectively displayed within the wireless tracking system, at least the environmental layout 1410, and a determined scale, and optionally an orientation, may form a geographic layout 1704 that functions as a geographic map for at least part of building 1401 (or other area represented at least in part by the environmental layout).

Figure 16:
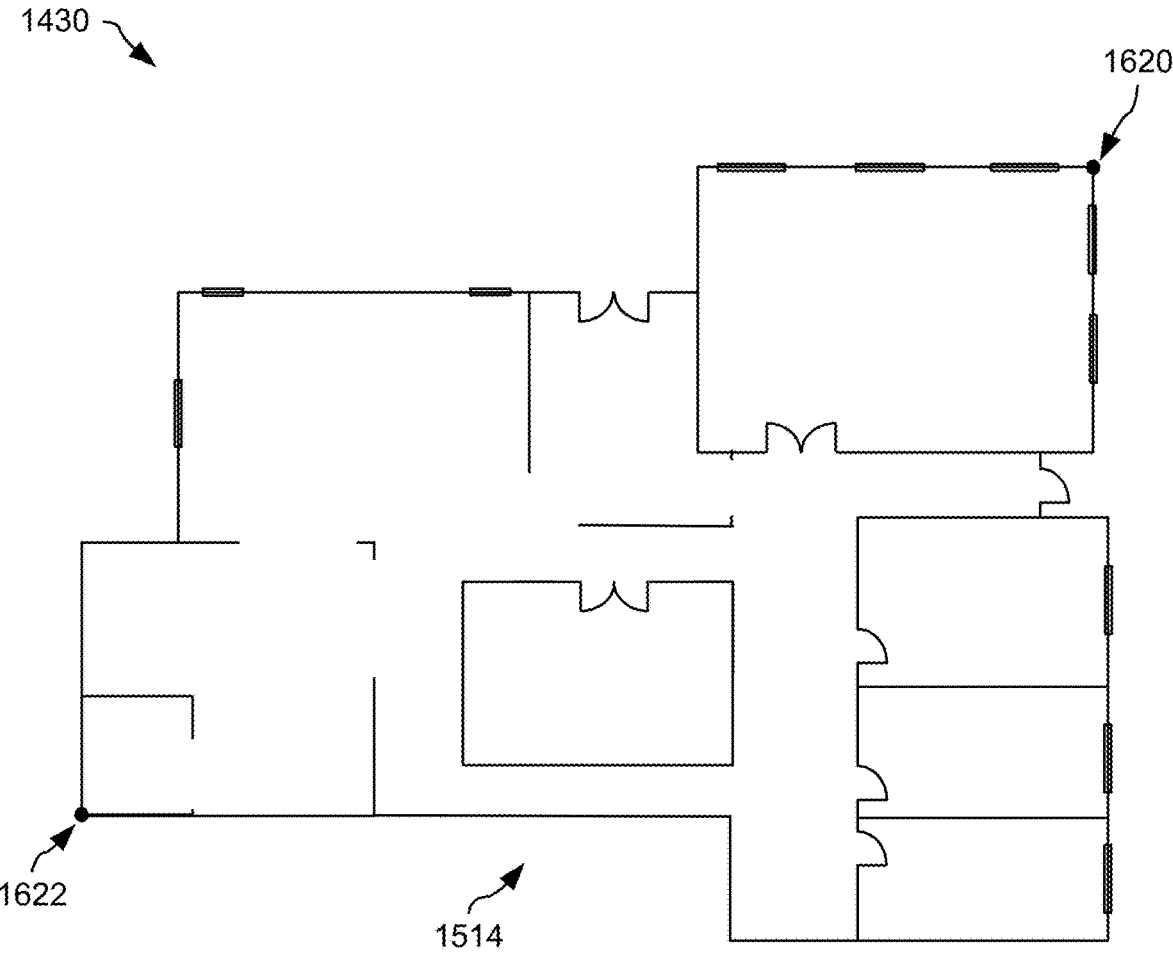

FIG. 16 is a schematic diagram illustrating two example geographic features 1620 and 1622 marked within image 1430 by user 1405 using app 1425. For example, app 1425 instructs user 1405 to define at least two geographic features 1620 and 1622 within image 1430 that may be related to existing maps. One example of a geographic feature is an infrastructure node where the geographic location is known.

Another example of a geographic feature is a physical aspect of environmental layout 1514 defined in image 1430 that may be discerned from a geographic map. Accordingly, on a graphical user interface of app 1425, user 1405 may interactively mark geographic features 1620 and 1622 on image 1430. App 1425 may determine pixel coordinates of each geographic feature 1620 and 1622 within image 1430.

Figure 17:
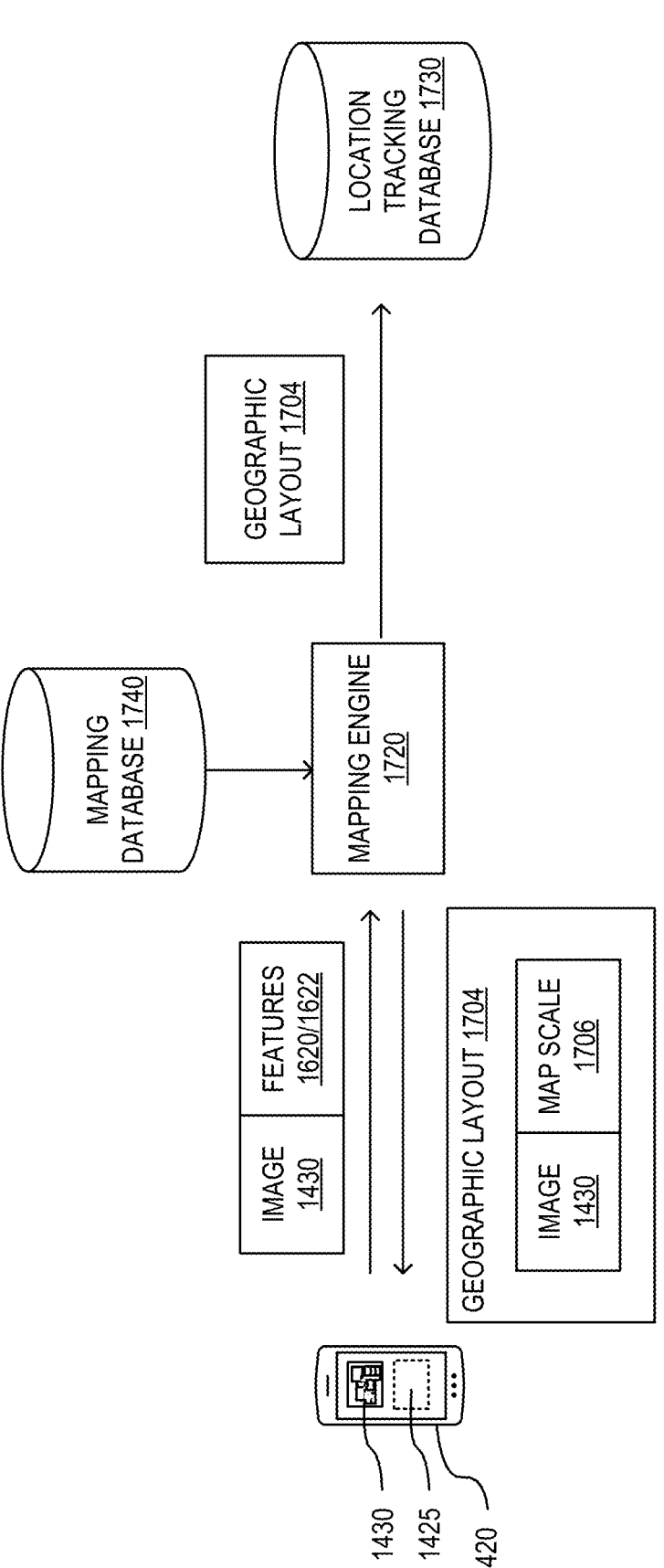

FIG. 17 is a data flow diagram illustrating example data movement and processing of captured image and marked geographic features 1620 and 1622 to generate a geographic layout 1704 based at least on a captured environmental layout and determined scale therefore. The generated geographic layout 1704 is scaled, oriented, and referenced to geographic coordinates. App 1425 sends image 1430 and the identified geographic features 1620 and 1622 to a mapping engine 1720 of the wireless tracking system. In certain embodiments, mapping engine 1720 is a software algorithm implemented in a server (e.g., server 804 of FIG. 8). In other embodiments, mapping engine 1720 is implemented as a distributed software algorithm within the wireless tracking system, wherein mapping engine 1720 is implemented on one or more nodes of the wireless tracking system. In other embodiments, mapping engine 1720 may be implemented on client device 1420, such as a component of app 1425 or separate application thereto.

Figure 18:
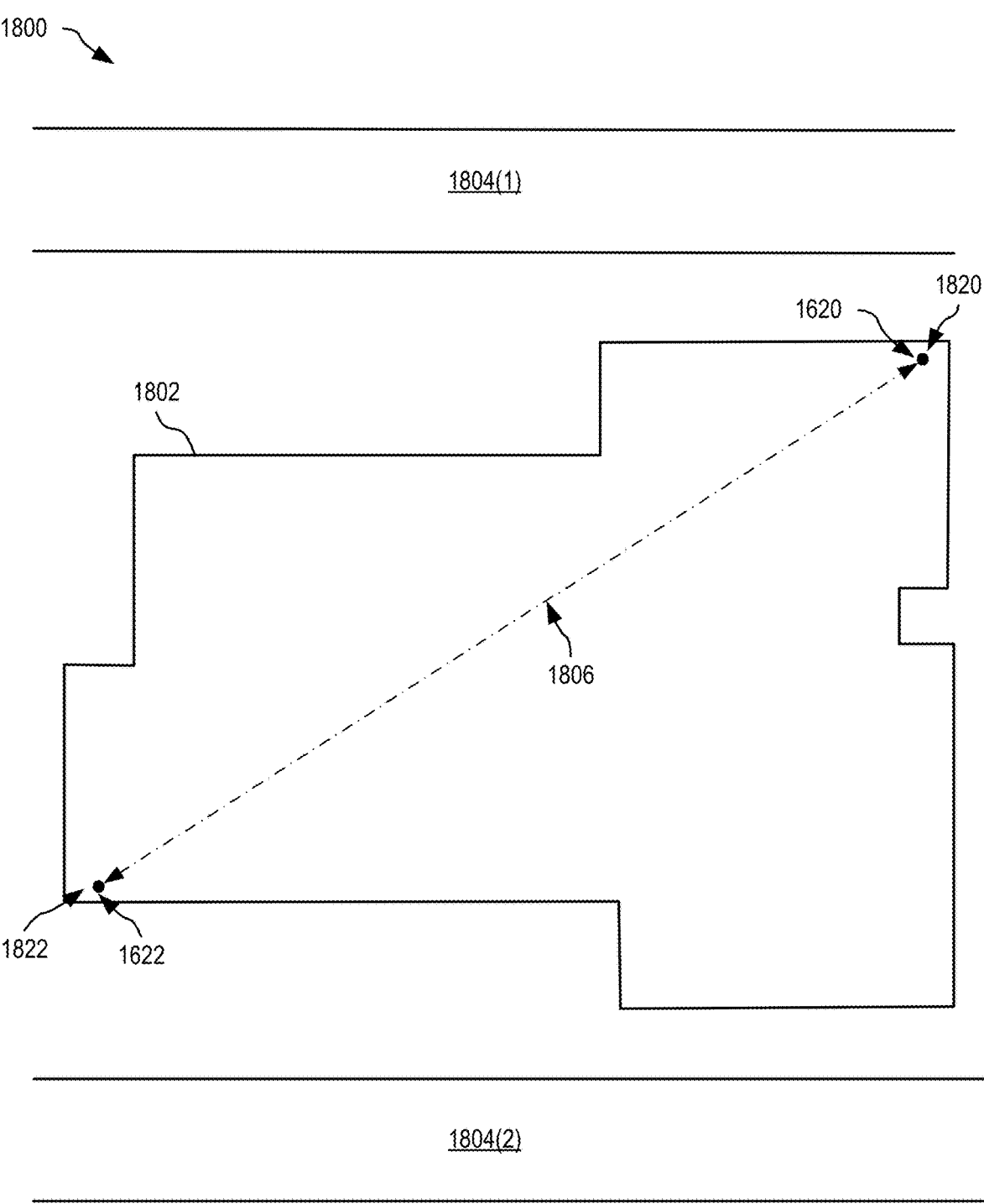
FIG. 18 is a schematic diagram illustrating one example technique for determining a scale for image, where each geographic feature (e.g., corners of building) is matched to corresponding features shown within a geographic map (e.g., a street plan, a satellite view, etc.).

FIG. 18 is a schematic diagram illustrating one example technique for determining a scale for image 1430, where each geographic feature 1620 and 1622 (e.g., corners of building 1401) is matched to corresponding features shown within a geographic map 1800 (e.g., a street plan, a satellite view, etc.) to determine real locations 1820 and 1822 of geographic feature 1620 and 1622, respectively. In the example of FIG. 18, geographic map 1800 shows an outline 1802 of building 1401 relative to streets 1804(1) and 1804 (2), as found in a geographic map and or satellite view of the area.

Mapping engine 1720 determines map scale 1706 that is used to convert the relative coordinates (e.g., the image coordinates, pixel coordinates, etc.) and distances between points on image 1430 (e.g., environmental layout 1514) to geographic coordinates such that they relate to true, real-world physical distances and coordinates. To determine map scale 1706, mapping engine 1720 selects geographic feature 1620 and 1622 on image 1430 of environmental layout 1514 that correspond to real-world geographic features. Geographic feature 1620 and 1622 are selected based on an input from user 1405 via interaction with client device 1420 (or another device), in some embodiments. For example, user may input indicate (e.g., input or select) two or more locations on image 1430 that correspond to corners of a building. In other embodiments, mapping engine 1720 automatically selects geographic feature 1620 and 1622 using a computer vision algorithm (see FIG. 23 and associated description) to identify corners of a building in image 1430 of environmental layout 1514.

Mapping engine 1720 may then determine a corresponding vector 1806 between the real geographic locations that, with the distance (e.g., in pixels) between the marked geographic features 1620 and 1622 in image 1430, allows mapping engine 1720 to determine a map scale 1706 (e.g., one or more of orientation, reference, and scaling factor) for image 1430. That is, the distance between the marked geographic features 1620 and 1622 in image 1430 corresponds to the determined length of vector 1806. Further, vector 1806 may also be used to define the orientation and geographic reference of image 1430. Mapping engine 1720 processes image 1430 and geographic features 1620 and 1622 to generate a geographic layout 1704 that is scaled, orientated, and references to geographic coordinates. In certain embodiments, geographic layout 1704 includes image 1430 and map scale 1706. Mapping engine 1720 sends geographic layout 1704 to one or both of a location tracking database 1730 of the wireless tracking system and client device 1420. In certain embodiments, mapping engine 1720 may combine multiple partial layouts (e.g., each represented by an environmental layout) s into a single geographic layout 1704.

In certain embodiments, a current location of client device 1420 is used to retrieve geographic map 1800. For example, GNSS location (e.g., GPS) or cellular-based location methods on client device 1420 (e.g., a smartphone) are used to determine a current location of client device 1420. In situations where GNSS location operates within building 1401, user 1405 may define geographic features 1620 and 1622 by moving to a location within building 1401 and interacting with the client device 1420 to input a point (e.g., dropping a pin) on image 1430 of environmental layout 1514 corresponding to their current location within building 1401, and repeating this process at additional locations. Thus, geographic features 1620 and 1622 defined on image 1430 and corresponding real locations 1820 and 1822 may be provided by user 1405 and client device 1420. In further embodiments, when user 1405 installs infrastructure node 1415 and defines its location on image 1430, location data from client device 1420 is used to associate its location on image 1430 with geographic coordinates. Accordingly, when multiple infrastructure nodes 1415 are installed, their corresponding points on image 1430 and determined geographic coordinates of client device 1420 may be used to determine map scale 1706.

Infrastructure nodes 1415 that include a GNSS location interface or cellular-based location capability may report their own geographic coordinates to the wireless tracking system and/or app 1425. Since app 1425 also receives a point, via user interaction with client device 1420, identifying the location of the installed infrastructure node on environmental layout 1514, the geographic coordinates received from each infrastructure node 1415 may be used to determine map scale 1706 by determining a vector between each point representing infrastructure nodes 1415, and determining scale based on the reported geographic coordinates from the infrastructure nodes 1415.

FIG. 19 is a flowchart illustrating one example method 1900 for determining a map scale 1706 for image 1430 of at least a portion of displayed environmental layout 1410. Method 1900 is implemented in mapping engine 1720 of FIG. 17, for example.

In block 1902, method 1900 receives image of at least a portion of an environmental layout (e.g., a floorplan, a photograph of an operational area, or outdoor environmental layout). In one example of block 1902, mapping engine 1720 receives image 1430 of environmental layout 1514 captured using client device 1420. In another example of block 1902, the image 1430 is downloaded from an image repository (e.g., a commercial real estate database, an emergency network database storing floorplans, environmental layouts, or images, or another image repository) having the environmental layout 1514.

In block 1904, method 1900 retrieves mapping data for a geographic area corresponding to the portion of the environment layout, the mapping data including at least a portion of a map. In one example of block 1904, mapping engine 1720 retrieves geographic map 1800 corresponding to an address of building 1401.

In block 1906, method 1900 identifies real locations within the mapping data that correspond to two or more geographic features indicated within the image of the environment layout. In one example of block 1906, mapping engine 1720 identifies real locations 1820 and 1822 on geographic map 1800 that correspond to geographic features 1620 and 1622 indicated with image 1430.

In block 1908, method 1900 determines geographic coordinates for each of the identified real locations. In one example of block 1908, mapping engine 1720 determines geographic coordinates for of each of real locations 1820 and 1822.

In block 1910, method 1900 determine a first distance between the at least two real locations based on the geographic coordinates and a second distance between the geographic features within the image. In one example of block 1910, mapping engine 1720 determines vector 1806 based on geographic coordinates of real locations 1820 and 1822 and a second distance between geographic features 1620 and 1622 indicated with image 1430.

In block 1912, method 1900 determines a map scale for the image of the portion of environment layout. In one example of block 1912, mapping engine 1720 determines a map scale based on vector 1806 and the distance in pixels between geographic features 1620 and 1622 indicated with image 1430.

In certain embodiments, mapping engine 1720 generates a graphical representative drawing (e.g., a 2D or 3D drawing) of the environment layout for use in lieu of image 1430 of the floorplan. For example, mapping engine 1720 may convert the photograph of the floorplan into a computer-generated drawing (e.g., a simple line drawing, vector drawing, or CAD model) that is more easily used and viewed in app 1425. Advantageously, the computer-generated image may have better visual clarity as compared to a photograph of the environmental layout (e.g., a floorplan).

Figure 20:
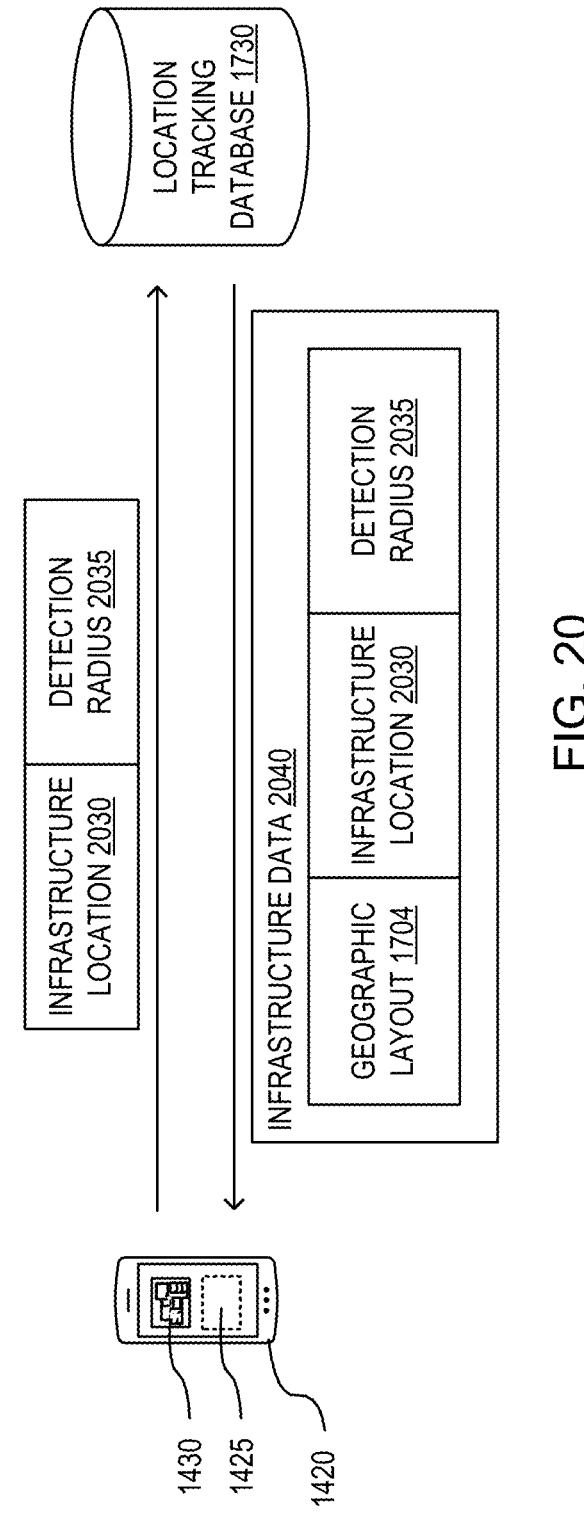
FIG. 20 is a data flow diagram illustrating example data movement to update and/or define location and radius of added infrastructure nodes, in embodiments.

FIG. 20 is a data flow diagram illustrating example data movement to update and/or define location and radius of added infrastructure nodes. User 1405 installs and configures infrastructure node 1415 and uses the graphical user interface of app 1425 to define a location of infrastructure node 1415 within image 1430. For example, app 1425 may detect user interaction with the client device 1420 that defines the location of infrastructure node 1415 within image 1430 (e.g., user dropping a pin at a location or otherwise indicating a location point in the image 1430), and app 1425 may determine infrastructure location 2030 as pixel coordinates of the selected location within image 1430. App 1425 may also detect user interaction with the client device that defines a detection radius 2035 of infrastructure node 1415.

In one example of operation, user 1405 may use client device 1420 to scan a barcode of infrastructure node 1415 and retrieve configuration data for infrastructure node 1415 based on the scanned identifier from the wireless tracking system (e.g., from location tracking database 1730). In some embodiments, client device 1420 pairs and configures infrastructure node 1415 based on the retrieved configuration data. App 1425 may also detect user interaction with client device 1420 that defines certain configuration parameters for infrastructure node 1415, such as a detection range. For example, user 1405 may set a detection radius for infrastructure node 1415 during its configuration. In one example, app 1425 determines detection radius 2035 (e.g., defined as pixel coordinates) by detecting that the user 1405 drags a distance from the defined location of infrastructure node 1415 within image 1430. In another example, app 1425 receives an input value (e.g., three meters) defining detection radius 2035. In another example, user 1405 traces an outline within image 1430 to define an irregularly shaped detection area of infrastructure node 1415 (e.g., where detection range of infrastructure node 1415 is restricted by structure of building 1401).

App 1425 sends infrastructure location 2030 and detection radius 2035 to the wireless tracking system where it may be converted to geographic coordinates and stored in location tracking database 1730. App 1425 and other nodes of the wireless tracking system may then retrieve updated infrastructure data 2040 from location tracking database 1730 for use in locating assets within building 1401. In certain embodiments, infrastructure data 2040 is an image including environmental layout 1514, infrastructure node graphical elements, and detection range graphical elements. Gateway nodes (e.g., stationary gateway 814 FIG. 8) of the wireless tracking system may download and locally store at least part of infrastructure data 2040. For example, infrastructure node 1415 may download at least part of geographic layout 1704, infrastructure location 2030, and detection radius 2035.

Figures 21A, 21B:
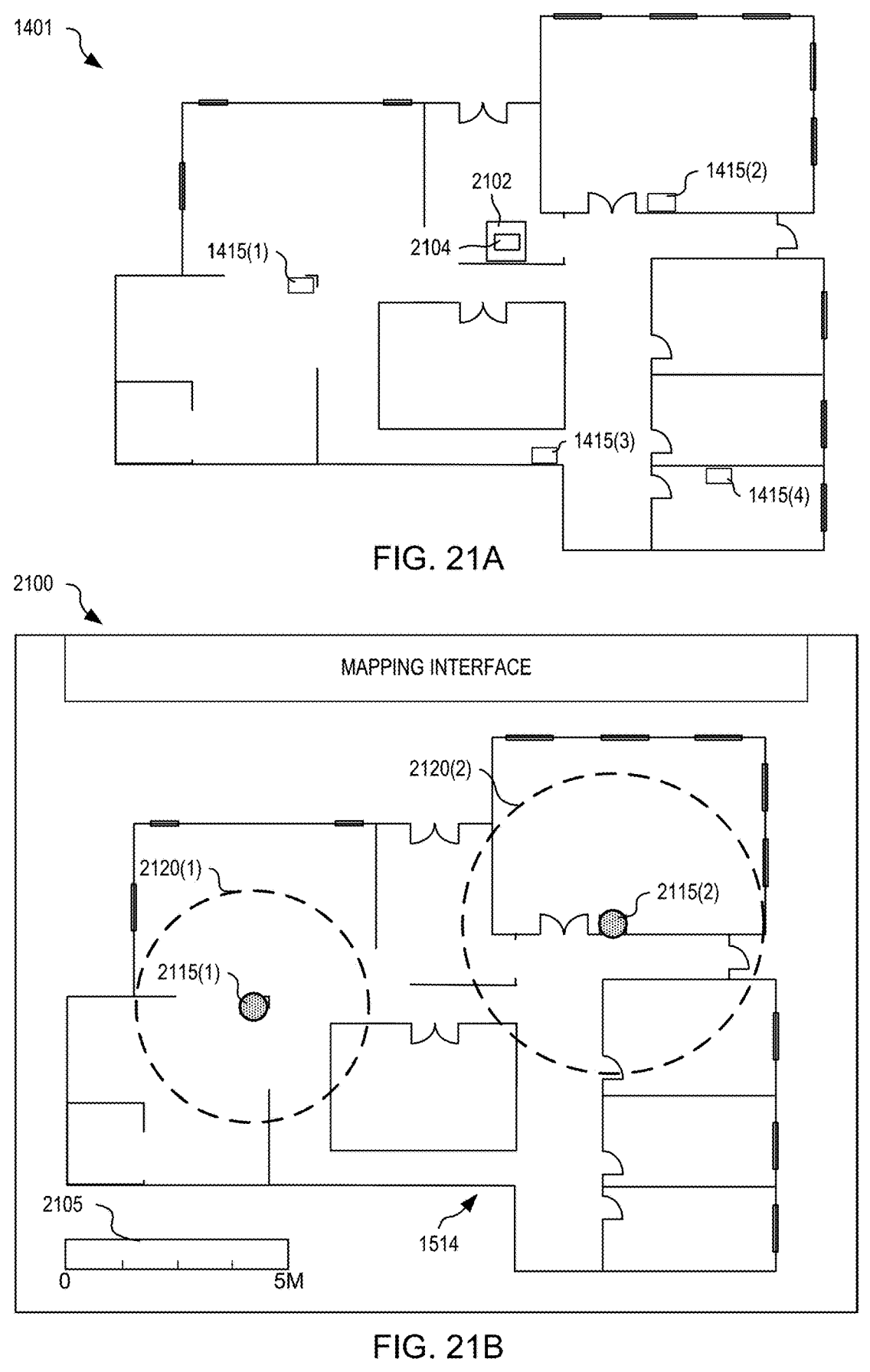

FIG. 21A is a schematic of building 1401 of FIG. 14 showing example positions for four infrastructure nodes 1415(1)-(4). Infrastructure nodes 1415 are positioned within different spaces of building 1401 to provide the wireless tracking system with tracking coverage therein. For purpose of the following example, FIG. 21A also shows an example asset 2102 (e.g., package 110, FIG. 1), fitted with a tracking node 2104 (e.g., segment 113, FIG. 1, tape node 818, FIG. 8, etc.), located within building 1401. Tracking node 2104 may represent an adhesive tape platform node attached to mobile asset 2102 that is moved around, such as during delivery of the asset. Tracking node 2104 may also be referred to as an "asset node."

FIG. 21B shows one example mapping display 2100 (e.g., as displayed by client device 1420) and illustrating at least part of infrastructure data 2040 corresponding to building 1401 of FIG. 14. For example, app 1425 may retrieve, from internal memory of client device 1420 or from an external server hosting location tracking database 1730, at least part of infrastructure data 2040 based on its determined location within building 1401. In certain embodiments, app 1425 may determine its location based on wireless signals from one or more infrastructure nodes 1415. Mapping display 2100 includes at least part of environmental layout 1514 overlayed with a map scale bar 2105, at least one node graphical element 2115 each representing a location of one infrastructure node 1415, and one detection range graphical element 2120 for each node graphical element 2115. For example, node graphical element 2115(1) represents a location of a first infrastructure node 1415(1) within building 1401, and node graphic element 2115(2) represents a location of a second infrastructure node 1415(2) within building 1401. Detection range graphical element 2120(1) represents a detection range of the first infrastructure node 1415(1) and detection range graphical element 2120(2) represents a detection range of the second infrastructure node 1415(2). Advantageously, mapping display 2100 allows user 1405 to rapidly assimilate coverage of infrastructure nodes 1415 within at least part of building 1401.

Infrastructure nodes 1415 are configured to detect tracking node 2104 (or any wireless node) when it enters a detection region of the infrastructure node based on wireless communications between the infrastructure node and the other wireless node. Each infrastructure node 1415 may be configured to detect/report to the wireless tracking system (e.g., wireless tracking system 800, FIG. 8) all wireless nodes of the tracking system that wirelessly communicate with the infrastructure node and are within a detection range (e.g., 2.5 meters) of the infrastructure node. The detection region of each infrastructure node may be adjustable and may be less than a maximum communication range of the infrastructure node. For example, tracking node 2104 and infrastructure node 1415 may be able to communicate outside the detection range (e.g., with a weaker signal at longer distances), but ignore each other until tracking node 2104 is within the defined detection range of infrastructure node 1415. For example, a desired detection range may be set during configuration of the infrastructure node. In certain embodiments, infrastructure node 1415 is configured to determine a distance (based partially on received signal strength, e.g., RSSI) of tracking node 2104, reporting its location when the distance is within the detection range and ignoring any tracking node that is at a distance greater than the detection range. In other embodiments, infrastructure node 1415 broadcasts its detection range and tracking node 2104 only communicates with infrastructure node 1415 when it determines, based on signal strength for example, that it is within the detection range of the infrastructure node.

In certain embodiments, tracking node 2104 receives a broadcast from infrastructure node 1415 that includes a description of the detection range (e.g., a detection radius) of the infrastructure node. Tracking node 2104 then determines its distance from the first wireless node (e.g., based on signal strength) and when the distance is greater than the defined detection range, tracking node 2104 does not interact with infrastructure node 1415.

Figure 22:
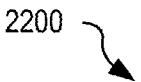
FIG. 22 shows one example mapping display (e.g., as displayed by client device) showing at least part of infrastructure data corresponding to building of FIG. 14 and illustrating one example augmented detection range graphical element for the node graphical element, in embodiments.

FIG. 22 shows one example mapping display 2200 (e.g., as displayed by client device 1420) showing at least part of infrastructure data 2040 corresponding to building 1401 of FIG. 14 and illustrating one example augmented detection range graphical element 2220(2) for node graphical element 2115(2). Mapping display 2200 is shows at greater magnification than mapping display 2100 of FIG. 21 and includes a corresponding map scale bar 2202, indicative of the scale of mapping display 2200. Particularly, augmented detection range graphical element 2220(2) depicting a more accurate detection range for the second infrastructure node 1415(2) corresponding to the shape and size of a room 2204 where it is located. For example, where walls of room 2204 restrict or block transmission of wireless signals, app 1425 may detect interaction with client device 1420 by user 1405 that defines augmented detection range graphical element 2220(2) to represent the detection area of the second infrastructure node 1415(2) more accurately. In one example, interfering or blocking portions of environmental layout 1514 may be indicated by user 1405 via interaction with client device 1420 and app 1425. For example, app 1425 detect user 1405 interaction with client device 1420 to draw a shape of the detection region on the mapping display 2200. That is, mapping display 2200 includes an option to draw on a touch screen of client device 1420 (or using a mouse, electronic pencil, etc.) to depict the detection region overlaid on environmental layout 1514. In another example, the wireless tracking system determines the interfering or blocking portions of environmental layout 1514 based on retrieved data from infrastructure nodes 1415. In another example, a detection range of one or more infrastructure nodes 1415 may be augmented/adjusted based on sensor data collected by infrastructure nodes 1415 (or other wireless nodes) in the environment. For example, one or more tape nodes in the environment may include a humidity sensor. Based on a detected humidity level in the environment of a wireless node, the detection region of the wireless node may be adjusted. For example, a radius of a detection region may be reduced when a higher-than-normal humidity level is detected. In certain embodiments, the detection region is augmented based on receiving sensor data outside of a normal range. In another embodiment, detection region may be augmented based on known construction characteristics of structure indicated within the environmental layout such as when a wall indicated in the environmental layout is configured in a manner that wireless signals will not propagate well through a thick wall, or a steel wall, or a vault, etc.

Advantageously, by more accurately representing the detection range of each infrastructure node 1415, user 1405 has a greater understanding of tracking by the wireless tracking system and is thereby aided in finding tracked assets (e.g., asset 2102 with tracking node 2104) within building 1401.

Figure 23:
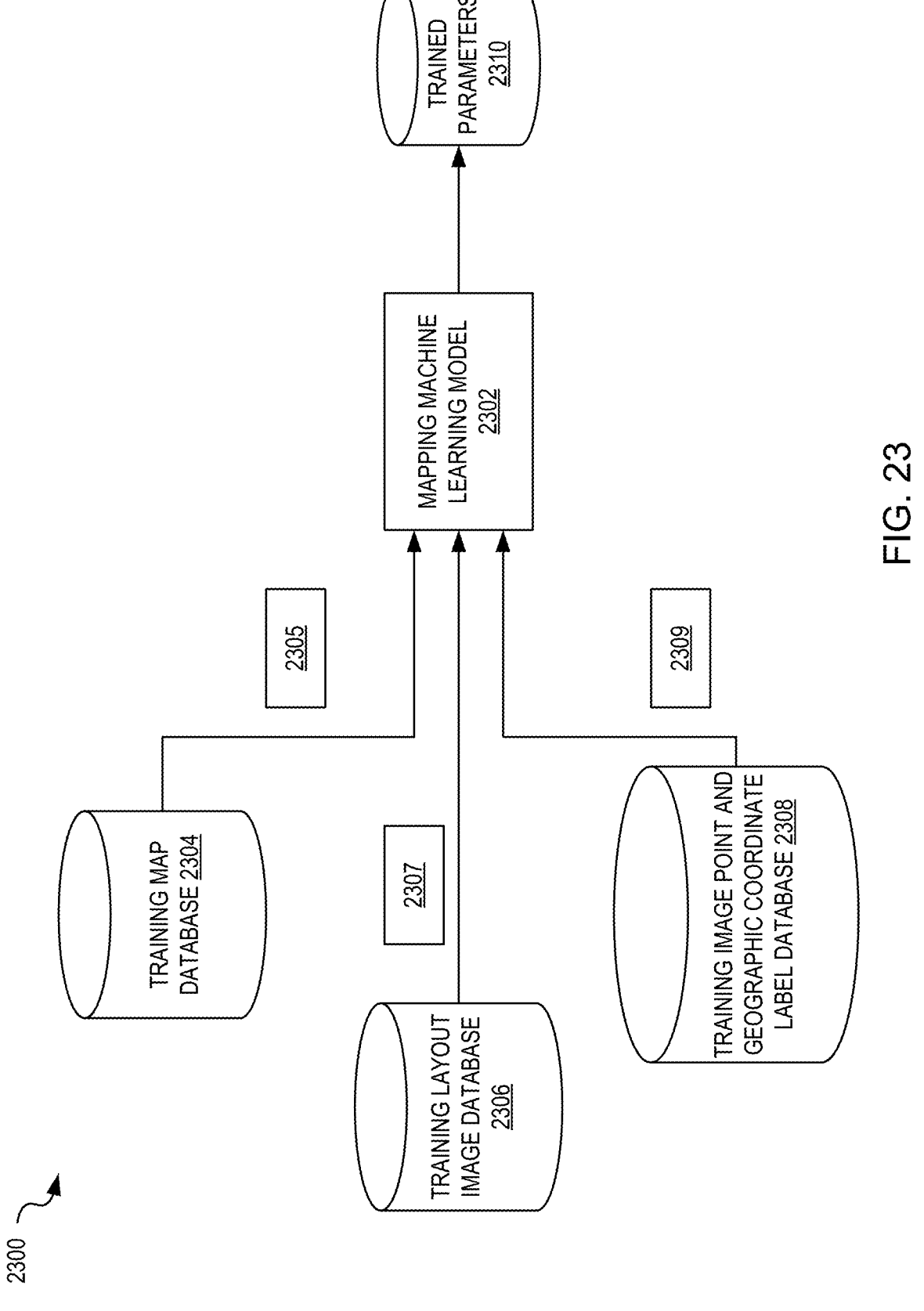
FIG. 23 is a data flow diagram illustrating one example training configuration for training a mapping machine learning model to automatically scale, orient, and reference a environmental layout image to a geographic map, in embodiments.
Figure 24:
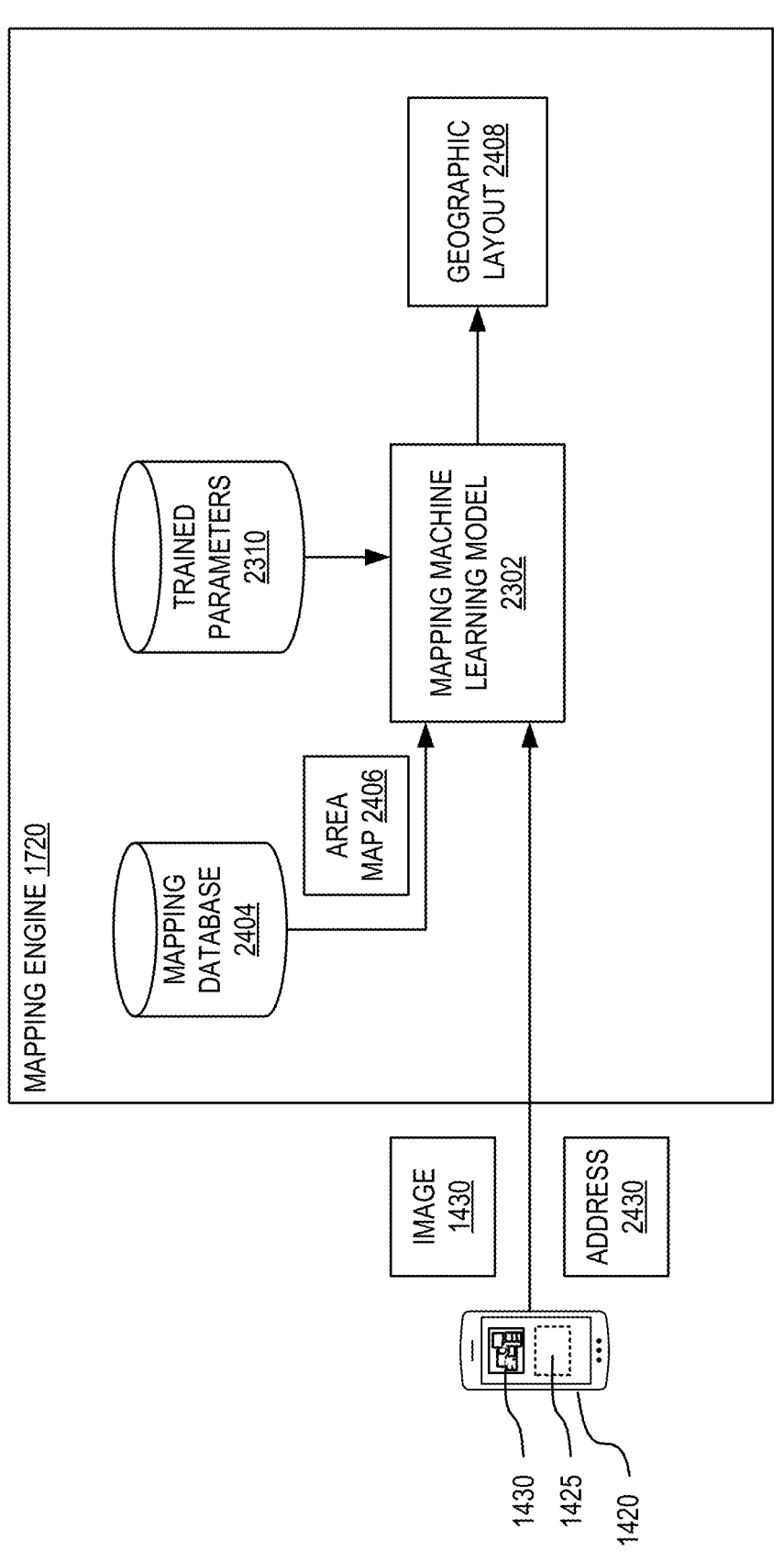
FIG. 24 is a data flow diagram illustrating example use of the trained mapping machine learning model of FIG. 23 within the mapping engine of FIG. 17, in embodiments.

FIG. 23 is a data flow diagram illustrating one example training configuration 2300 for training a mapping machine learning model 2302 to automatically scale, orient, and reference an environmental layout (e.g., a floorplan) image to a geographic map. FIG. 24 is a data flow diagram illustrating example use of trained mapping machine learning model 2302 of FIG. 23 within mapping engine 1720 of FIG. 17. FIGS. 23 and 24 and best viewed together with the following description.

Mapping machine learning model 2302 receives training geographic maps 2305 from a training map database 2304, training layout images 2307 from a training layout image database 2306, and optionally, training image points and geographic coordinate labels 2309 from a training image point and geographic coordinate label database 2308. For supervised learning, a user optionally inputs training points on the training images and defines corresponding geographic coordinate labels. Mapping machine learning model 2302 processes training geographic maps 2305, training layout images 2307, and optionally, training image points and geographic coordinate labels 2309 to generate trained parameters 2310.

Mapping engine 1720 receives image 1430 and an address 2430 (e.g., a postal address of building 1401 or other geographic reference for the area) from client device 1420, Mapping engine 1720 retrieves a geographic area map 2406 from mapping database 2404 based on address 2430 and then controls mapping machine learning model 2302 to use trained parameters 2310 to match image 1430 to geographic area map 2406 to generate geographic layout 2408 including image 1430 and map scale 1706 that defines orientation, reference, and scaling factor for image 1430. That is, trained mapping machine learning model 2302 automatically aligns and scales image 1430 with geographic area map 2406.

As described above, mapping engine 1720 allows user 1405 to capture an image of a displayed layout and use it to accurately define locations of infrastructure nodes and their detection ranges. Advantageously, the infrastructure nodes may be deployed and located without requiring a trained technician, since user 1405 may use client device 1420 to generate and calibrate the imaged layout (e.g., environmental layout 1514) for use with defining added infrastructure locations and for locating tracked assets.

Figure 25:
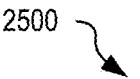
FIG. 25 is a schematic illustrating one example mapping interface showing an environmental layout, a map scale, infrastructure node representations, and their corresponding detection ranges, in embodiments.

FIG. 25 is a schematic illustrating one example mapping interface 2500 showing environmental layout 1514, a map scale 2502, node graphical elements 2515 and corresponding detection range graphical elements 2520. Mapping interface 2500 allows user 1405 to quickly see tracking coverage by the wireless tracking system within the displayed portion of building 1401. Mapping interface 2500 may allow user 1405 to zoom in and out and pan the displayed environmental layout as needed to view the desired detail.

In the example of FIG. 25, detection range graphical elements 2520 further illustrate overlap that provide additional information for locating tracked assets, particularly where the node on the asset is concurrently detected by two different infrastructure nodes 1415.

FIG. 25 also shows a client graphical element 2504 that indicates a current location of client device 1420 within environmental layout 1514. For example, client device 1420 may determine its location based on one or more of cellular triangulation/trilateration, GPS, Wi-Fi RSS, or based on trilateration of a Bluetooth connection with infrastructure nodes 1415. App 1425 may then convert, using map scale 1706, the determined location of client device 1420 to pixel coordinates and overlay client graphical element 2504 onto image 1430. Accordingly, user 1405 may easily see their relative location when searching for an asset. Although the client graphical element 2504 is shown as a circle in the example of FIG. 25, the graphical element 2504 may be visually different, according to other embodiments. For instance, the client graphical element 2504 may be a graphical representation of a person, have a shape of a chevron, or include other graphics.

Figure 26:
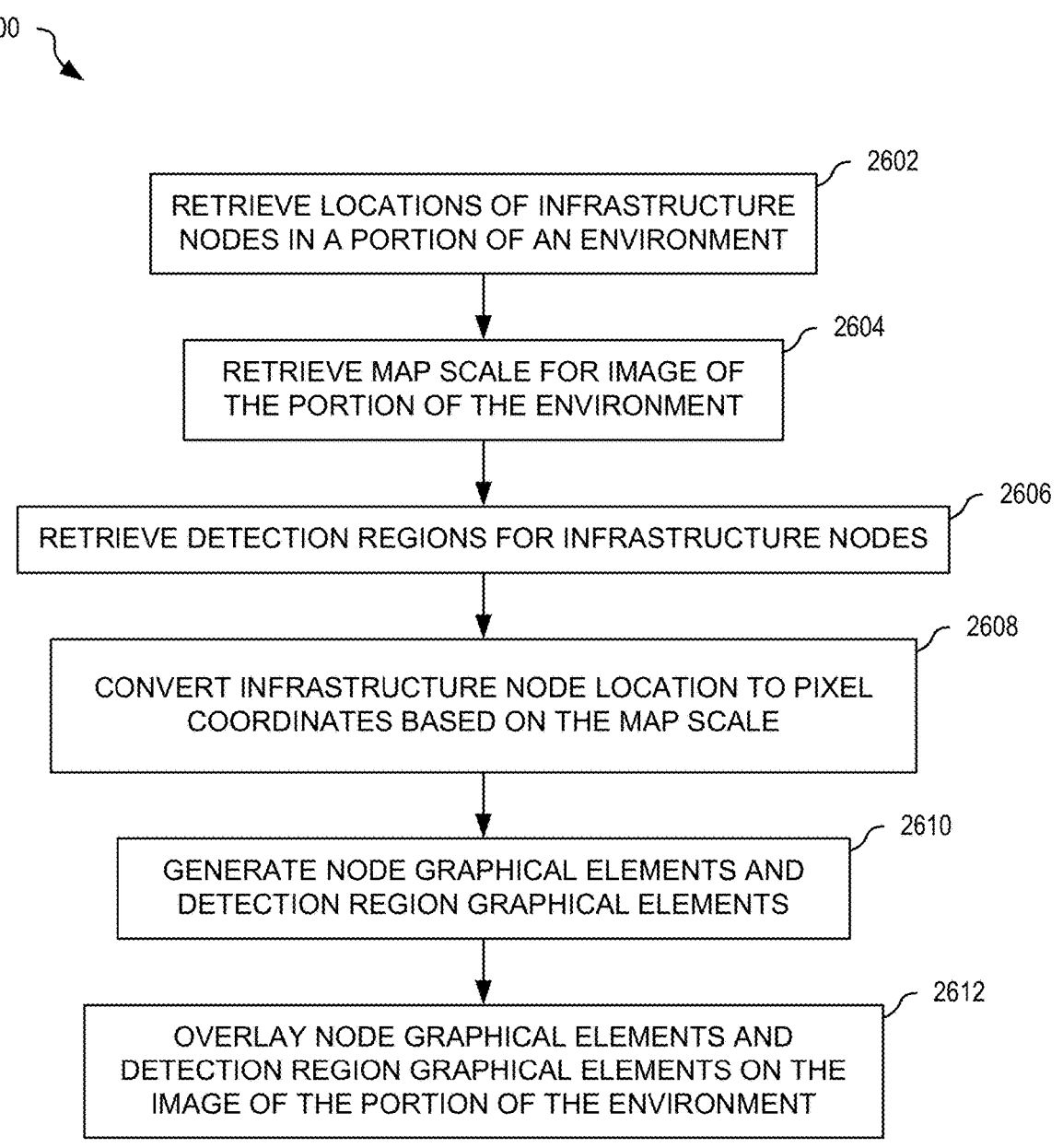
FIG. 26 is a flowchart illustrating one example method for overlaying a scaled version of a detection region of an infrastructure node on an image of a portion of a environmental layout in a mapping user interface, in embodiments.

FIG. 26 is a flowchart illustrating one example method 2600 for overlaying a scaled version of a detection region of an infrastructure node on an image of a portion of a environmental layout in a mapping user interface. Method 2600 is implemented in mapping engine 1720 of FIG. 17 for example.

In block 2602, method 2600 retrieve positions of infrastructure nodes in a portion of an environment. In one example of block 2602, mapping engine 1720 receives geographic location information (e.g., geographic coordinates) of infrastructure nodes 1415(1)-(4). In another example of block 2602, mapping engine 1720 receives relative location information (e.g., cartesian coordinates relative to image 1430) of infrastructure nodes 1415(1)-(4). In certain embodiments, location tracking database 1730 stores one or both of geographic coordinates and cartesian coordinates of each infrastructure node 1415.

In block 2604, method 2600 retrieves a map scale for an image of the portion of the environment. In one example of block 2604, mapping engine 1720 retrieves map scale 1706 for image 1430. In block 2606, method 2600 retrieves detection regions for the infrastructure nodes. In one example of block 2606, mapping engine 1720 retrieves detection radius 2035 from location tracking database 1730.

In block 2608, where geographic location information is retrieved in block 2602, method 2600 converts infrastructure node location from geographic coordinates to pixel coordinates based on the map scale. In one example of block 2608, mapping engine 1720 uses map scale 1706 to convert geographic coordinates of infrastructure node 1415 to pixel coordinates of image 1430, and converts detection radius 2035 from a distance (e.g., four meters) to pixel coordinates of image 1430.

In block 2610, method 2600 generates node graphical elements and detection region graphical elements. In one example of block 2610, mapping engine 1720 uses map scale 1706 to generate node graphical element 2115(1), node graphic element 2115(2), detection range graphical element 2120(1), and detection range graphical element 2120(2) as overlays for image 1430.

In block 2612, method 2600 overlays the node graphical elements and the detection region graphical elements on the image of the portion of the environment. In one example of block 2612, mapping engine 1720 overlays node graphic element 2115(1), node graphic element 2115(2), detection range graphical element 2120(1), and detection range graphical element 2120(2) into image 1430 based on the determined pixel coordinates.

Improved Asset Location

Figure 27:
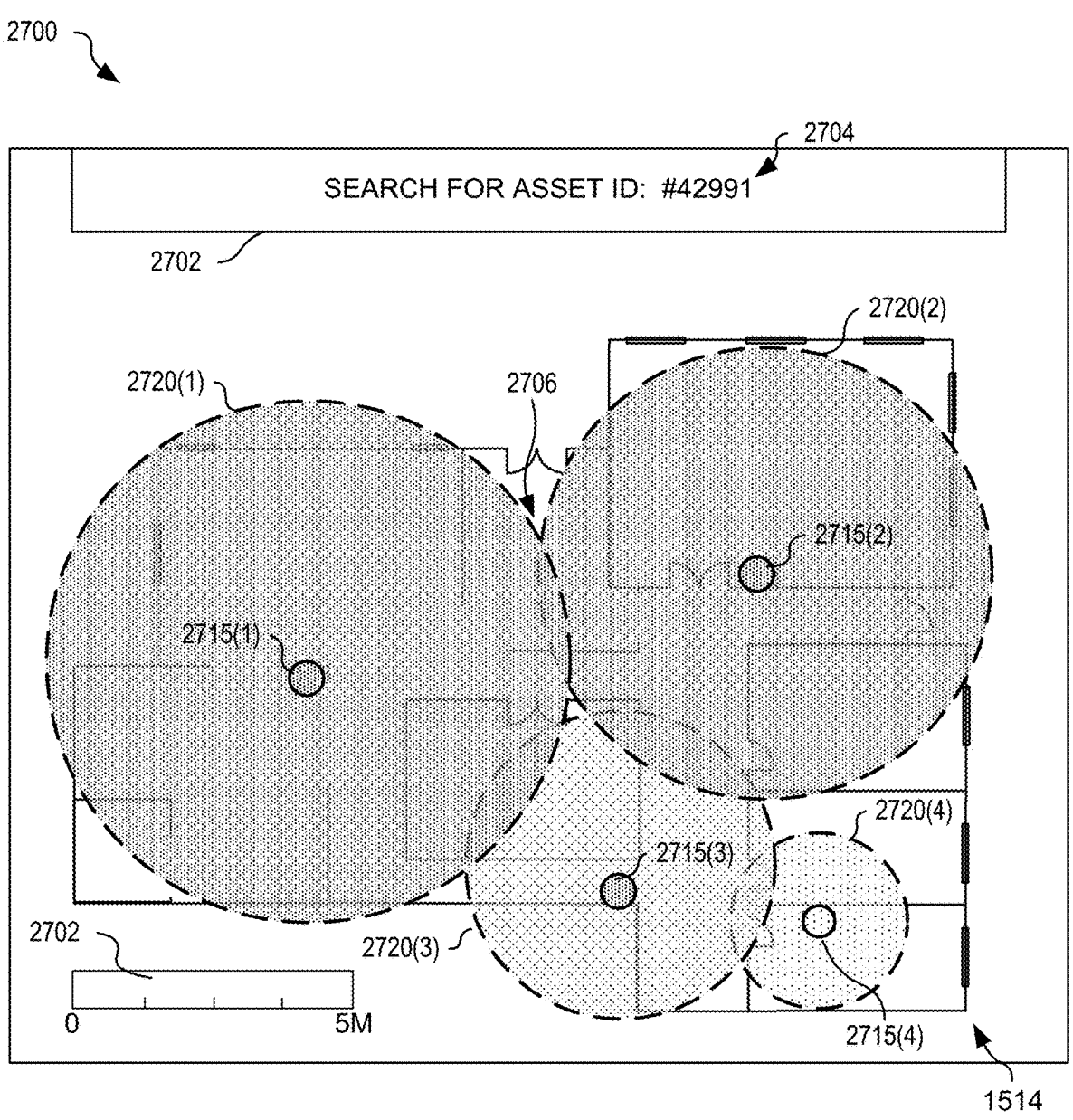
FIG. 27 shows one example locating interface that is generated by mapping engine of FIG. 17 to aid user in locating tracking node, and thereby asset, in embodiments.

FIG. 27 shows one example locating interface 2700 that is generated by mapping engine 1720 of FIG. 17 to aid user 1405 in locating tracking node 2104, and thereby asset 2102. Locating interface 2700 is displayed by client device 1420 when a search is initiated and may include an interactive dialog box 2702 for receiving an asset identifier 2704 corresponding to asset 2102 for example. For example, app 1425 running on client device 1420 may implement an asset location application that implement locating interface 2700. In one example, client device 1420 detects interaction by user 1405 entering asset identifier 2704. In another example, user 1405 controls client device 1420 to scan a barcode or QR code corresponding to asset 2102 and/or tracking node 2104. For example, the corresponding barcode may be a valet tag or portion (e.g., a tear-off portion) of tracking node 2104 that is separated from asset 2102. In another example, the wireless tracking system determines that tracking node 2104 is outside an expected area and initiates a search for tracking node 2104. In another example, the wireless tracking system determines that no communication between tracking node 2104 and an expected infrastructure node 1415 has occurred for over a threshold period of time and initiates a search for tracking node 2104.

App 1425 sends asset identifier 2704 to mapping engine 1720, which may communicate with other components of the wireless tracking system to translate the asset identifier 2704 into a node identifier as needed.

Mapping engine 1720 interrogates location tracking database 1730 (and/or other components of the wireless tracking system, such as server 804) to determine a communication recency between each infrastructure node 1415(1)-(4) and tracking node 2104 (e.g., when each infrastructure node 1415(1)-(4) last communicated with tracking node 2104). In the example of FIG. 27, infrastructure nodes 1415(1) and 1415(2) are currently communicating with tracking node 2104, infrastructure node 1415(3) recently (e.g., within the last two hours) communicated with tracking node 2104, and infrastructure node 1415(4) communicated with tracking node 2104 in the past (e.g., more than two hours ago). In certain embodiments, based on the communication recency of each infrastructure node 1415, mapping engine 1720 generates node graphical elements 2715 with a characteristic (e.g., one or more of shape, fill, size, color, etc.) corresponding to their communication recency. In the example of FIG. 27, mapping engine 1720 generates node graphical elements 2715(1) and 2715(2) using a first color (e.g., green) to indicate current communication, generates node graphical element 2715(3) in a second color (e.g., yellow) to indicate recent communication, and generates node graphical element 2715(4) in a third color (e.g., red) to indicate past communication. As appreciated, more of fewer communication period and/or different characteristics may be used without departing from the scope hereof. In certain embodiments, mapping engine 1720 may display node graphical elements 2715 for infrastructure nodes 1415 that have never communicated with tracking node 2104 on the asset as gray nodes. Colors green, red, yellow, and gray are used as example herein, however, the embodiments disclosed herein are not limited these colors, shapes, and graphics.

In certain embodiments, mapping engine 1720 may depict detection range graphical elements 2720 of each infrastructure node 1415 in a corresponding color based on the last communication status of each infrastructure node 1415. For example, mapping engine 1720 generates detection range graphical elements 2720(1) and 2720(2) in a translucent green color, detection range graphical element 2720(3) in a translucent yellow color, and detection range graphical element 2720(4) in a translucent red color. Accordingly, areas of environmental layout 1514 covered in translucent green represent areas of building 1401 where the asset is likely to be found. Advantageously, Advantageously, locating interface 2700 allows user 1405 to rapidly assimilate locations where the asset is likely to be found. More particularly, an overlap area 2706 of detection range graphical elements 2720(1) and 2720(2) represents the most likely location for the asset, since it is currently in communication with both infrastructure node 1415(1) and 1415(2).

Figure 28:
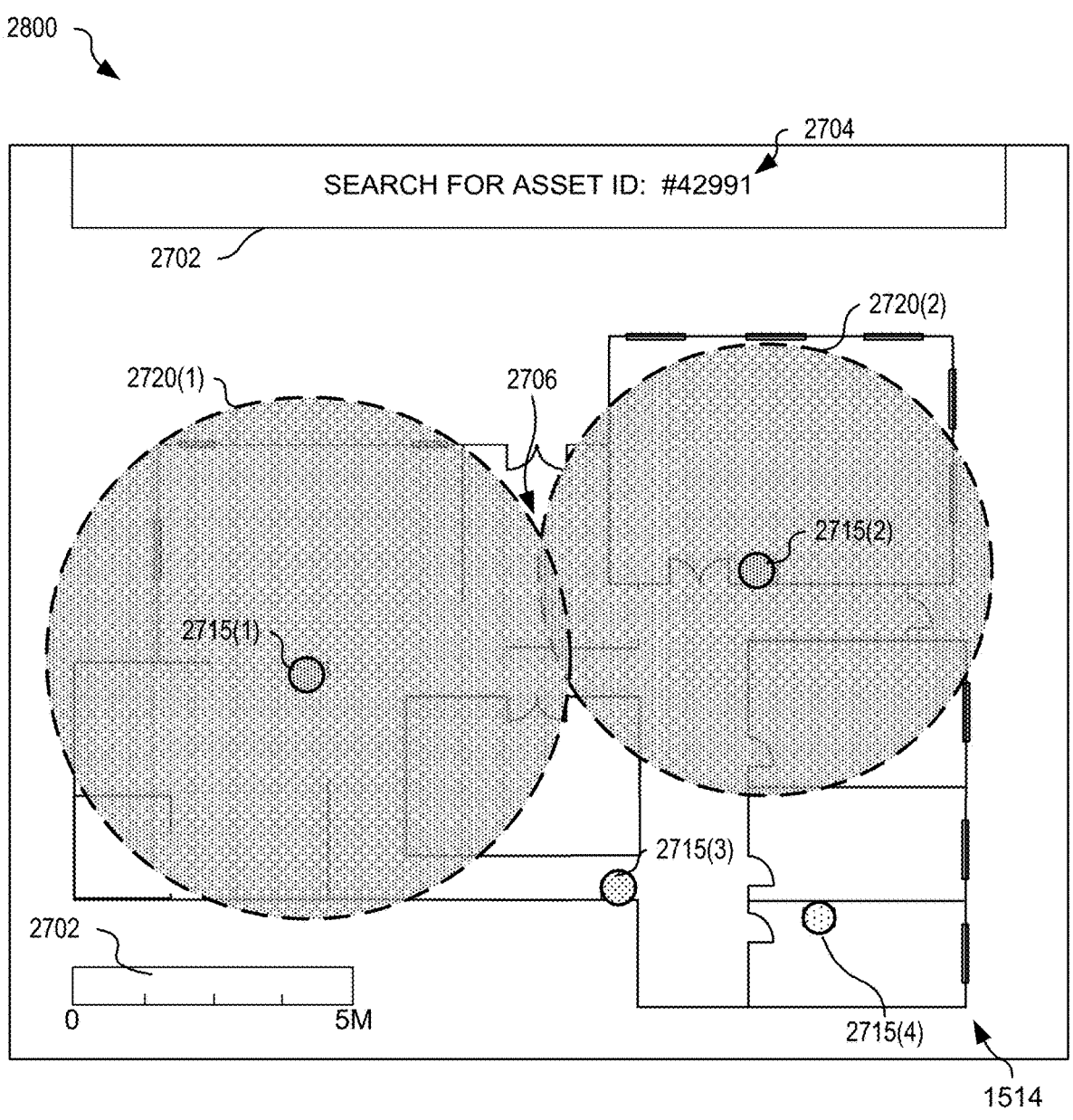
FIG. 28 shows one example locating interface that is similar to locating interface of FIG. 27 but where mapping engine has hidden less important detection range graphical elements, in embodiments.

FIG. 28 shows one example locating interface 2800 that is similar to locating interface 2700 of FIG. 27 but where mapping engine 1720 has hidden less important detection range graphical elements 2720(3) and 2720(4). In this example, importance is determines based on the last communication time, where current communication is the highest importance, and no communication is the lowest importance. Accordingly, mapping engine 1720 displays detection range graphical elements 2720 of the highest importance available within the portion of the environment displayed. In another example, when infrastructure nodes 1415(1) and 1415(2) are not currently communicating with tracking node 2104, locating interface 2800 may only show node graphical element 2715(3) (e.g., a yellow dot) and a corresponding detection range graphical element in translucent yellow.

Advantageously, by hiding less important detection range graphical elements 2720(3) and 2720(4), user 1405 is less distracted by less relevant data and learns more quickly of areas to search for asset 2102.

Figure 29:
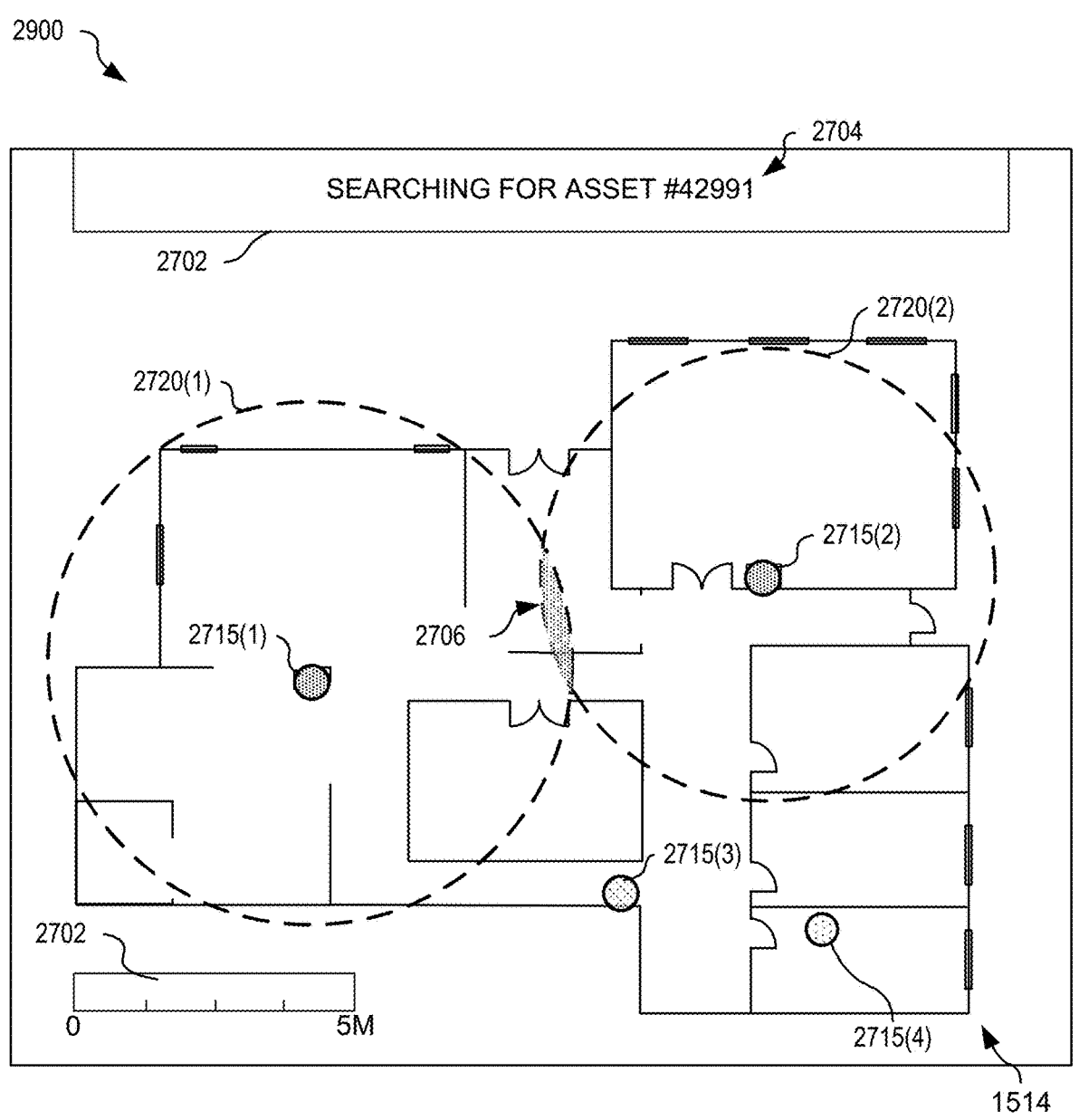
FIG. 29 shows one example locating interface that is similar to locating interface of FIG. 28 but where mapping engine only highlights overlap area of detection range graphical elements in the translucent color (e.g., green), in embodiments.

FIG. 29 shows one example locating interface 2900 that is similar to locating interface 2800 of FIG. 28 but where mapping engine 1720 only highlights overlap area 2706 of detection range graphical elements 2720(1) and 2720(2) in the translucent color (e.g., green). Advantageously, by only showing overlap area 2706 in translucent color, locating interface 2900 highlights the most important area for user 1405 to search for asset 2102. In certain embodiments, overlap area 2706 is colored based on a number of overlapping detection range graphical elements 2720. For example, the shade of green for overlap area 2706 is darker for higher numbers of detection range graphical elements 2720 that overlap.

Figure 30:
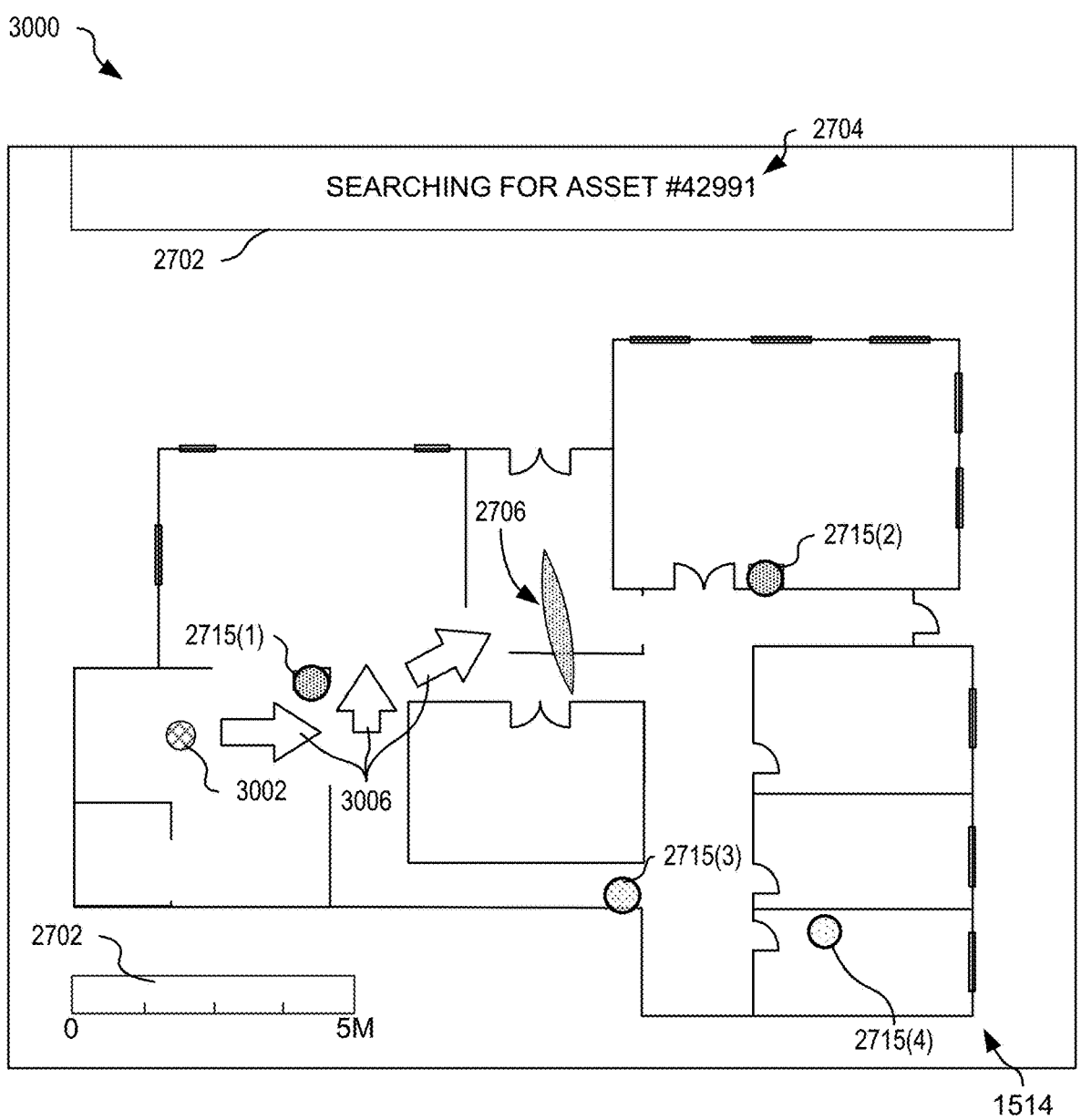
FIG. 30 shows one example locating interface that is similar to locating interface of FIG. 29 but where mapping engine further hides detection range graphical elements, leaving only overlap area in translucent color, in embodiments.

FIG. 30 shows one example locating interface 3000 that is similar to locating interface 2900 of FIG. 29 but where mapping engine 1720 further hides detection range graphical elements 2720(1) and 2720(2), leaving only overlap area 2706 in translucent color. In certain embodiments, overlap area 2706 may be represented as a generic shape (e.g., circle, rectangle, etc.) or a shape that matches the features of environmental layout 1410 (e.g., conforming to walls). Advantageously, by only showing overlap area 2706 in translucent color, locating interface 2900 highlights the most important area for user 1405 to search for the asset without the distraction of detection range graphical elements 2720(1) and 2720(2).

Locating interface 3000 may also show a client graphical element 3002 that indicates a current location of client device 1420 within environmental layout 1514. Accordingly, user 1405 may easily see which direction to walk when searching for the asset.

In certain embodiments, locating interface 3000 may also display a route guidance graphical overlay 3006 (e.g., one or more arrows, a breadcrumb trail, etc.) that guide user 1405 from the location indicated by client graphical element 3002 to an area in which to search for asset 2102.

Figure 31B:
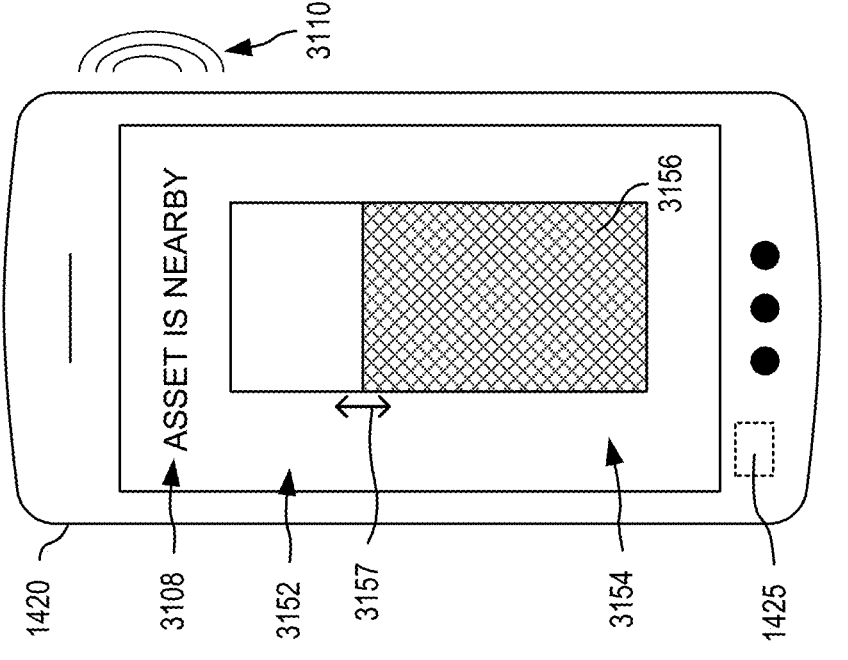
FIGS. 31A and 31B show example proximity searching interfaces, respectively, for indicating proximity of client device to tracking node of asset, in embodiments.
Figure 31A:
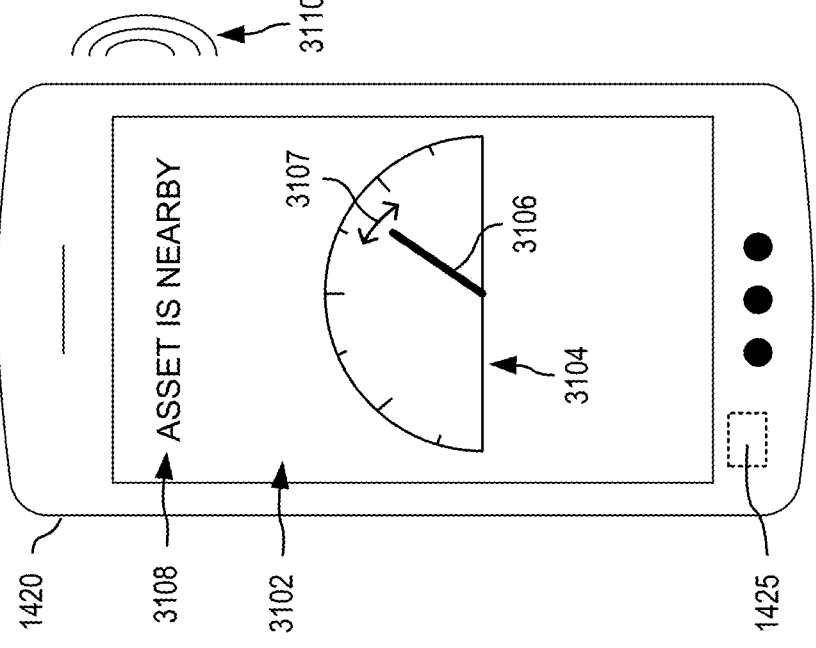

FIGS. 31A and 31B show example proximity searching interfaces 3102 and 3152, respectively, for indicating proximity of client device 1420 to tracking node 2104 of asset 2102. User 1405 may switch to one of proximity searching interfaces 3102 and 3152 as needed or app 1425 may automatically switch to one of proximity searching interfaces 3102/3152 when client device 1420 established communication with tracking node 2104. For example, app 1425 may automatically stop displaying locating interface 3000 and display one of searching interfaces 3102 and 3152 as client device 1420 approaches tracking node 2014 and short-range communication is established between the client device and the tracking node. Proximity searching interfaces 3102 and 3152 may be particularly useful when asset 2102 is at least partially hidden from user 1405.

When app 1425 is in communication with tracking node 2104, app 1425 may determine a distance (e.g., based on signal strength) between client device 1420 and tracking node 2104. Proximity searching interface 3102 shows a dial 3104 with a needle 3106 that are similar to a Geiger counter display. App 1425 causes needle 3106 to move from left to right, as indicated by arrow 3107, based on a distance between client device 1420 and tracking node 2104. That is, the closer client device 1420 gets to tracking node 2104, the further right needle 3106. App 1425 may also provide a visual prompt 3108 and/or an audio signal 3110 indicative of proximity of client device 1420 to tracking node 2104. For example, visual prompt 3108 may change messages at various distances, and audio signal 3110 may change characteristics (e.g., clicking rate, tone frequency, volume, etc., or combination thereof) based on the distance.

Proximity searching interface 3152 shows a bar 3154 with a filled portion 3156 that changes, as indicated by arrow 3157, based on a distance between client device 1420 and tracking node 2104. For example, as client device approaches tracking node 2104, filled portion 3156 occupies more of bar 3154.

Advantageously, through use of one or more locating interfaces 2700, 2800, 2900, and 3000 of FIGS. 27, 28, 29, and 30, and one or more of proximity searching interfaces 3102 and 3152 of FIGS. 31A and 31B, app 1425 provides easily assimilated information for finding asset 2102 within building 1401.

Figure 32:
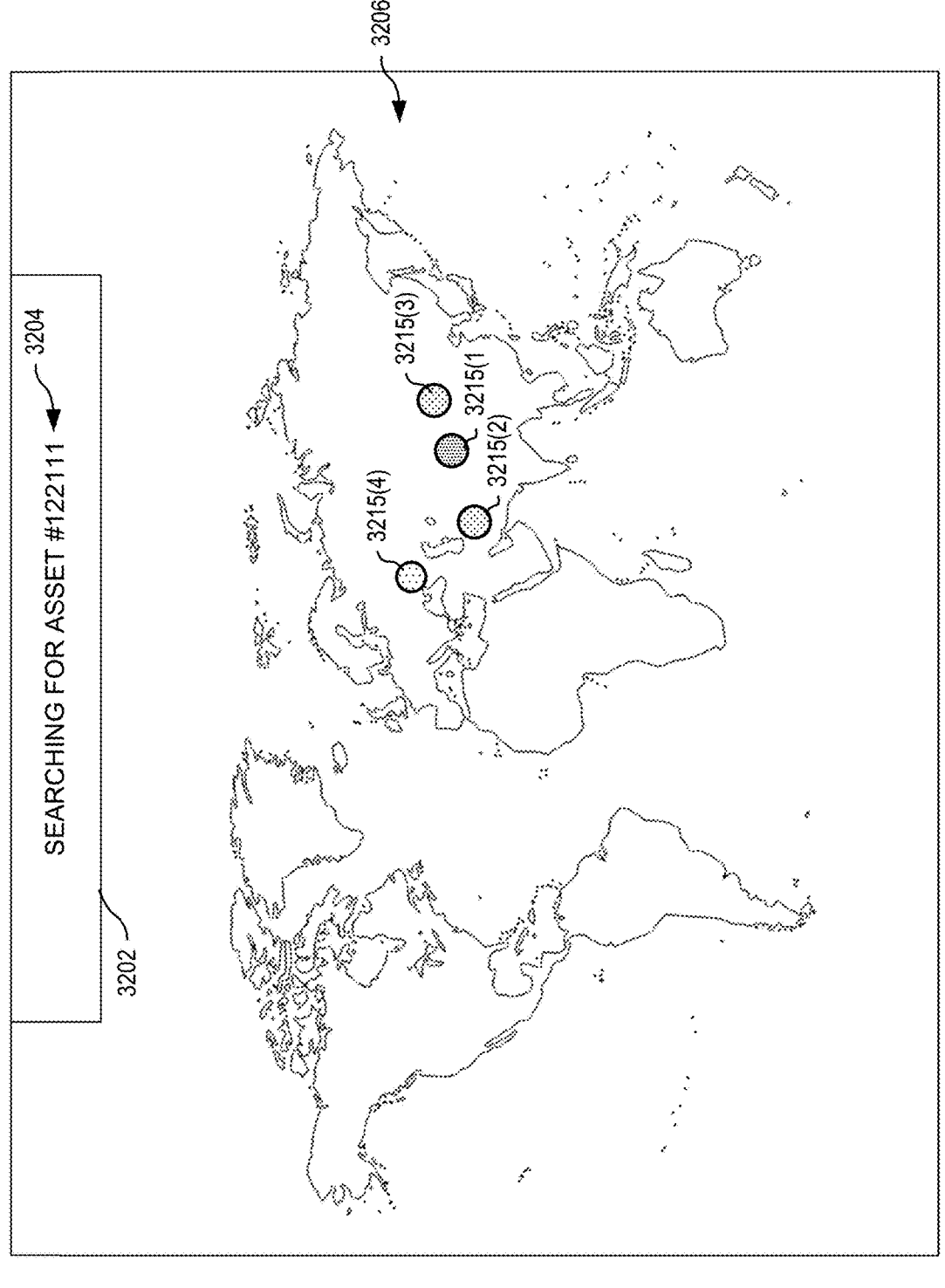
FIG. 32 is a global locating interface for locating an asset anywhere in the world, in embodiments.

FIG. 32 is a global locating interface 3200 for locating an asset anywhere in the world. The wireless tracking system may include a global network of wireless nodes where locations of all wireless nodes in the wireless tracking system are recorded in location tracking database 1730.

Global locating interface 3200 includes an interactive dialog box 3202 for receiving an asset identifier 2704 (e.g., entered by user 1405 or scanned from a barcode etc.), and at least part of a world map 3206. Mapping engine 1720 searches location tracking database 1730 to retrieve infrastructure data corresponding to any globally located infrastructure nodes that have current communication, recent communication, or past communication, with the tracking node attached to the asset. Mapping engine 1720 then overlays, based on the recorded location of the globally located infrastructure nodes, a most relevant set of node graphical elements 3215, where a color or other characteristic of each node graphical elements 3215 indicates a priority of the reported location for the asset. In the example of FIG. 32, global locating interface 3200 shows a green node graphical element 3215(1) that indicates a location of an infrastructure node in current contact with the tracking node on the asset, two yellow node graphical elements 3215(2) and 3215(3) that indicate locations of infrastructure nodes in recent contact with the tracking node on the asset, and a red node graphical element 3215(4) that indicates a location of an infrastructure node that has had past contact with the tracking node on the asset.

Advantageously, user 1405 may interact with client device 1420 and global locating interface 3200 to locate an asset (e.g., using its tracking node) that is currently communicating, has recently communicated, and/or has communicated in the past with infrastructure nodes. For example, global locating interface 3200 may allow user 1405 to zoom in on a specific location to view details at a more granular level. App 1425 may switch from global locating interface 3200 to one of locating interfaces 2700, 2800, 2900, 3000, of FIGS. 27, 28, 29, and 30, respectively, when user 1405 zooms in on a specific location.

In certain embodiments, non-infrastructure nodes of the wireless tracking system may operate to locate wireless tracking nodes. For example, app 1425 running on client device 1420 may operate as a gateway node (e.g., see mobile gateway 810 and client application 822 of FIG. 8) that interacts and locates nearby wireless tracking nodes using its current location.

Each of locating interfaces 2700, 2800, 2900, 3000, of FIGS. 27, 28, 29, and 30, and global locating interface 3200 of FIG. 30 may be updated in real time as client devices (e.g., client device 1420) move throughout an environment.

Figure 33:
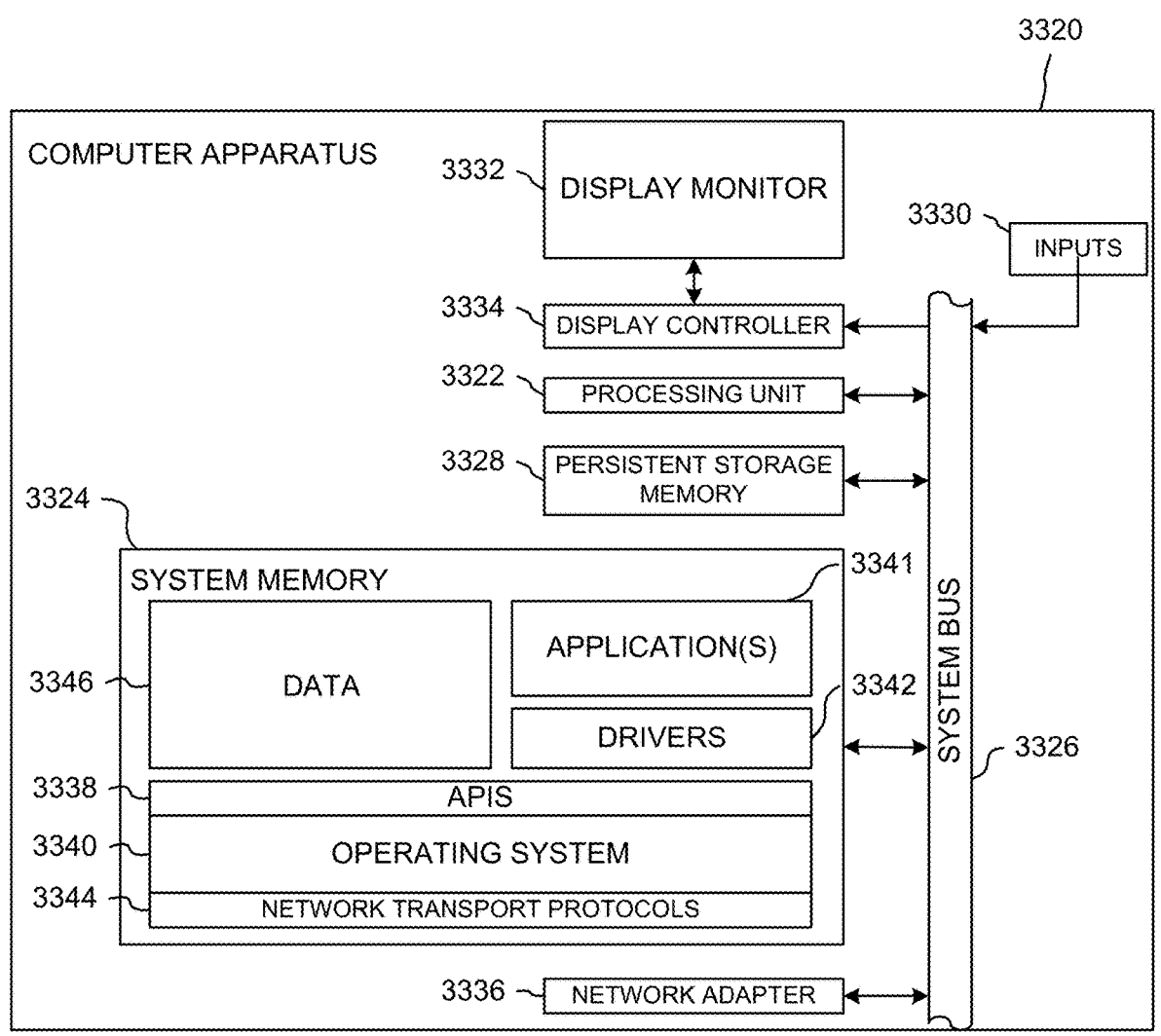
FIG. 33 shows one example computer apparatus that, either alone or in combination with one or more other computing apparatus, is operable to implement one or more of the computer systems described in this specification, in embodiments.

FIG. 33 shows an example embodiment of computer apparatus 3320 that, either alone or in combination with one or more other computing apparatus, is operable to implement one or more of the computer systems described in this specification. For example, computer apparatus 3320 may represent any of segments 113, FIG. 1, wireless transducing circuit 114, wireless transducing circuit 410, FIG. 4, segments 640, 670, 680 of FIGS. 6A, 6B, and 6C, server(s) 804, mobile gateways 810, 812, and tape nodes 818, 828, 832, 842, 846, 860, 866 of FIG. 8, server(s) 904, tape nodes 982, 976, 972 of FIG. 9, nodes 1120, 1126, 1134, 1138, 1158, 1160, 1162, and 1151 of FIGS. 11A-C, nodes 1290, 1291, 1292, and 1294 of FIG. 12, nodes 1330, 1338, and 1340 of FIG. 13, infrastructure node 1415 and client device 1420 of FIG. 14, mapping engine 1720 of FIG. 17, and mapping machine learning model of FIG. 23. The computer apparatus 3320 includes a processing unit 3322, a system memory 3324, and a system bus 3326 that couples the processing unit 3322 to the various components of the computer apparatus 3320. The processing unit 3322 may include one or more data processors, each of which may be in the form of any one of various commercially available computer processors. The system memory 3324 includes one or more computer-readable media that typically are associated with a software application addressing space that defines the addresses that are available to software applications. The system memory 3324 may include a read only memory (ROM) that stores a basic input/output system (BIOS) that contains start-up routines for the computer apparatus 3320, and a random-access memory (RAM). The system bus 3326 may be a memory bus, a peripheral bus, or a local bus, and may be compatible with any of a variety of bus protocols, including PCI, VESA, Microchannel, ISA, and EISA. The computer apparatus 3320 also includes a persistent storage memory 3328 (e.g., a hard drive, a floppy drive, a CD ROM drive, magnetic tape drives, flash memory devices, and digital video disks) that is connected to the system bus 3326 and contains one or more computer-readable media disks that provide non-volatile or persistent storage for data, data structures and computer-executable instructions.

A user may interact (e.g., input commands or data) with the computer apparatus 3320 using one or more input devices 3330 (e.g. one or more keyboards, computer mice, microphones, cameras, joysticks, physical motion sensors, and touch pads). Information may be presented through a graphical user interface (GUI) that is presented to the user on a display monitor 3332, which is controlled by a display controller 3334. The computer apparatus 3320 also may include other input/output hardware (e.g., peripheral output devices, such as speakers and a printer). The computer apparatus 3320 connects to other network nodes through a network adapter 3336 (also referred to as a "network interface card" or NIC).

A number of program modules may be stored in the system memory 3324, including application programming interfaces 3338 (APIs), an operating system (OS) 3340 (e.g., the Windows® operating system available from Microsoft Corporation of Redmond, Wash. U.S.A.), software applications 3341 including one or more software applications programming the computer apparatus 3320 to perform one or more of the steps, tasks, operations, or processes of the positioning and/or tracking systems described herein, drivers 3342 (e.g., a GUI driver), network transport protocols 3344, and data 3346 (e.g., input data, output data, program data, a registry, and configuration settings).

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

In certain embodiments, a method of finding an asset, includes: determining a distance between a client device and a tracking node of the asset based at list in part on a signal strength of a wireless communication between the client device and the tracking node; and displaying, on the client device, a searching interface having a graphical meter, wherein the graphical meter indicates the distance between the client device and the tracking node.

The method may further include displaying a needle on a scale to form the graphical meter, wherein the needle moves in real time based on the distance between the client device and the tracking node.

The method may further include displaying a fill bar on a bar scale to form the graphical meter, wherein the fill bar moves in real time based on the distance between the client device and the tracking node.

The method may further include generating an audio output indicative of the distance between the client device and the tracking node. Wherein audio characteristics of the audio output indicate the distance, wherein the audio characteristics are selected from the group comprising: a frequency of a clicking sound, a frequency of a tone, and a volume of the tone.

Combination of Features

Features described above as well as those claimed below may be combined in various ways without departing from the scope hereof. The following enumerated examples illustrate some possible, non-limiting combinations:

(A1) A method includes: receiving an image of at least part of an environmental layout; receiving at least two geographic feature locations associated with the image; determining at least two geographic locations each corresponding to a respective one of the at least two geographic feature locations; determining a map scale for the images based on the at least two geographic feature locations and the at least two geographic locations; and wherein the map scale allows conversion between points on the image and geographic locations.

(A2) In embodiments of (A1), the at least part of the environmental layout comprises at least part of a floorplan.

(A3) In either of embodiments (A1) or (A2), the image being captured by, and received from, a client device.

(A4) In any of embodiments (A1)-(A3), the determining at least two geographic locations includes training a machine learning model to match the at least two geographic feature locations to matched geographic locations of a geographic map; and determining the at least two geographic locations each corresponding to a respective one of the matched geographic locations.

(A5) In any of embodiments (A1)-(A4), the map scale defining an orientation, a reference, and a scaling factor for the image.

(A6) In any of embodiments (A1)-(A5), using at least the image and the map scale to form a geographic layout of an area at least partially represented by the image.

(A7) Any of embodiments (A1)-(A6) further including retrieving an infrastructure location for each of at least one infrastructure node in an environment; retrieving at least part of the geographic layout based at least in part on the infrastructure location; generating a mapping interface based at least in part on the at least part of the geographic layout; generating a node graphical element for each of the at least one infrastructure node based on the map scale; and overlaying the node graphical element on the mapping interface based at least in part on the infrastructure location and the map scale.

(A8) Any of embodiments (A1)-(A7) further including retrieving a detection region for each of the at least one infrastructure node; generating a detection range graphical element based on the detection region and the map scale; and overlaying the detection range graphical element on the mapping interface based at least in part on the infrastructure location and the map scale.

(A9) In any of embodiments (A1)-(A8), the node graphical element being scaled based on the map scale.

(A10) Any of embodiments (A1)-(A9) further including determining a tracking node corresponding to an asset to be found; identifying at least one infrastructure node having communicated with the tracking node; determining, for each of the at least one infrastructure node, a communication recency between the infrastructure node and the tracking node, wherein a priority order of values for the communication recency from highest to lowest is: current communication, recently communicated, and past communication; retrieving an infrastructure location for each of the at least one infrastructure node; retrieving at least part of the geographic layout based on the infrastructure location; generating a locating interface based on the at least part of the geographic layout; generating a node graphical element for each of the at least one infrastructure node based on the map scale, wherein a characteristic of the node graphical element is based on the communication recency; and overlaying the node graphical element on the locating interface based on the infrastructure location and the map scale.

(A11) Any of embodiments (A1)-(A10) further including retrieving a detection region for each of the at least one infrastructure node; generating a detection range graphical element based on the detection region and the map scale, wherein a characteristic of the node graphical element is based on the communication recency; and overlaying the detection range graphical element on the locating interface based at least in part on the infrastructure location and the map scale.

(A12) Any of embodiments (A1)-(A11) further including retrieving a detection region for each of the at least one infrastructure node; when the communication recency of the at least one infrastructure node is at a highest priority, generating a detection range graphical element based on the detection region and the map scale, wherein a color of the node graphical element is based on the communication recency; and overlaying the detection range graphical element on the locating interface based on the infrastructure location and the map scale.

(A13) Any of embodiments (A1)-(A12) further including determining at least two of the at least one infrastructure node having the communication recency of current communication; retrieving a detection region for each of the at least two infrastructure nodes; generating an overlap area graphical element for an overlap area between the detection region of each of the at least two infrastructure nodes; and overlaying the overlap area graphical element on the locating interface based on the infrastructure location and the map scale.

(A14) Any of embodiments (A1)-(A13) further including determining a current location of a client device; generating a client device graphical element for the client device; and overlaying the client device graphical element on the locating interface based on the current location and the map scale.

(A15) In any of embodiments (A1)-(A14), the node graphical element being scaled based on the map scale.

(A16) In any of embodiments (A1)-(A15), the determining the tracking node including detecting user interaction with a user device indicating request from a user to find the asset.

(A17) In any of embodiments (A1)-(A16), the determining the tracking node including determining that the tracking node is outside an expected area.

(A18) In any of embodiments (A1)-(A17), the determining the tracking node including determining that the tracking node has not communicated with an expected infrastructure node for over a threshold period of time.

(B1) A method includes: receiving an image captured by a user device of at least part of an environmental layout; generating, based on the image, a geographic layout associated with an area depicted in the image; and outputting the geographic layout for use in a client device interface.

(B2) In embodiments of (B1), the user device is the same device running the client device interface.

(B3) In either of embodiments (B1) or (B2), the outputting including storing the geographic layout in a cloud server for on-demand access by another user device.

(B4) Any of embodiments (B1)-(B3) further including receiving at least two geographic feature locations associated with the image; determining at least two geographic locations each corresponding to a respective one of the at least two geographic feature locations; determining a map scale for the image based on the at least two geographic feature locations and the at least two geographic locations; and wherein the map scale allows conversion between points on the image and geographic locations.

(B5) In any of embodiments (B1)-(B4), the receiving, from the user device, at least two geographic feature locations including receiving Cartesian coordinates of the at least two geographic feature locations interactively selected on the image by the user.

(B6) Any of embodiments (B1)-(B5) further including receiving an indication of a tracking node to be tracked; determining a location of the tracking node; accessing a location database to retrieve at least part of the geographic layout associated with the determined location; and outputting the associated geographic layout to the user device.

(B7) In any of embodiments (B1)-(B6), receiving the indication including determining that the tracking node has not communicated with an infrastructure node for at least a predefined period.

(B8) In any of embodiments (B1)-(B7), receiving the indication including detecting user interaction with the user device indicating a request from a user to find an asset associated with the tracking node.

(B9) In any of embodiments (B1)-(B8), the client device interface is an asset location application.

(B10) Any of embodiments (B1)-(B9) further including receiving a location of an infrastructure node; and overlaying a graphical representation of the infrastructure node on the geographic layout at a position corresponding to the received location of the infrastructure node.

(B11) In any of embodiments (B1)-(B10), the receiving the location of the infrastructure node including receiving, from the user device, Cartesian coordinates indicative of a user selected location of the infrastructure node on the geographic layout.

(C1) A method includes: determining a tracking node corresponding to an asset to be found; identifying at least one infrastructure node having communicated with the tracking node; determining, for each of the at least one infrastructure node, a communication recency between the infrastructure node and the tracking node, wherein a priority order of values for the communication recency from highest to lowest is: current communication, recently communicated, and past communication; retrieving an infrastructure location for each of the at least one infrastructure node; retrieving at least part of a geographic layout based on the infrastructure location; generating a locating interface based on the at least part of the geographic layout; generating a node graphical element for each of the at least one infrastructure node, wherein a characteristic of the node graphical element is based on the communication recency; and overlaying the node graphical element on the locating interface based on the infrastructure location.

(C2) The embodiment (C1) further including retrieving a detection region for each of the at least one infrastructure node; generating a detection range graphical element based on the detection region, wherein a characteristic of the node graphical element is based on the communication recency; and overlaying the detection range graphical element on the locating interface based at least in part on the infrastructure location.

(C3) In either of embodiments (C1) or (C2), communication between the tracking node at the at last one infrastructure node occurs only when the tracking node is within the detection region of the infrastructure node.

(C4) In any of embodiments (C1)-(C3), the infrastructure node determines a range of the tracking node and communicates only when the range indicates the tracking node is within the detection region.

(C5) In any of embodiments (C1)-(C4), the infrastructure node broadcasts its detection region and the tracking node communicates with the infrastructure node only when the tracking node determines it is within the detection region.

(C6) In any of embodiments (C1)-(C5), the detection region is less than a maximum wireless communication range of the infrastructure node.

(C7) Any of embodiments (C1)-(C6) further including retrieving a detection region for each of the at least one infrastructure node; when the communication recency of the at least one infrastructure node is at a highest priority, generating a detection range graphical element based on the detection region and the map scale, wherein a color of the node graphical element is based on the communication recency; and overlaying the detection range graphical element on the locating interface based on the infrastructure location and the map scale.

(C8) Any of embodiments (C1)-(C7) further including determining at least two of the at least one infrastructure node having the communication recency of current communication; retrieving a detection region for each of the at least two infrastructure nodes; generating an overlap area graphical element for an overlap area between the detection region of each of the at least two infrastructure nodes; and overlaying the overlap area graphical element on the locating interface based on the infrastructure location and the map scale.

(C9) Any of embodiments (C1)-(C8) further including the method includes determining a current location of a client device; generating a client device graphical element for the client device; and overlaying the client device graphical element on the locating interface based on the current location and the map scale.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method, comprising:
receiving location information from at least two infrastructure nodes having location capability;
receiving an image of at least part of an environmental layout;
receiving at least two geographic feature locations associated with the image, the geographic feature locations being defined by user interaction with a client device displaying the image to identify points of each of the at least two infrastructure nodes on the image;
determining at least two geographic locations each corresponding to a respective one of the at least two geographic feature locations using the received location information;
determining a vector between the at least two geographic locations;
determining a pixel distance between the at least two geographic feature locations in the image;
determining a map scale for the image based on the at least two geographic feature locations, the at least two geographic locations corresponding to the at least two geographic feature locations, the vector, and the pixel distance;
displaying, according to the map scale, the environmental layout on a client-device mapping interface, wherein the map scale allows conversion between any point on the environmental layout as displayed on the mapping interface and a geographic location; and overlaying a node graphical element representing one of the at least two infrastructure nodes on the mapping interface displaying the environmental layout.

2. The method of claim 1, wherein the at least part of the environmental layout comprises at least part of a floorplan.

3. The method of claim 1, the image being captured by, and received from, the client device.

4. The method of claim 1, the map scale defining an orientation, a reference, and a scaling factor for the image.

5. The method of claim 4, using at least the image and the map scale to form a geographic layout of an area at least partially represented by the image.

6. The method of claim 5, further comprising:

retrieving an infrastructure location for each of at least one infrastructure node in an environment;

retrieving at least part of the geographic layout based at least in part on the infrastructure location;

generating the mapping interface based at least in part on the at least part of the geographic layout; and generating the node graphical element for each of the at least one infrastructure node based on the map scale.

7. The method of claim 5, further comprising:

determining a tracking node corresponding to an asset to be found;

identifying at least one infrastructure node having communicated with the tracking node;

determining, for each of the at least one infrastructure node, a communication recency between the infrastructure node and the tracking node, wherein a priority order of values for the communication recency from highest to lowest is: current communication, recently communicated, and past communication;

retrieving an infrastructure location for each of the at least one infrastructure node;

retrieving at least part of the geographic layout based on the infrastructure location;

generating a locating interface based on the at least part of the geographic layout;

generating the node graphical element for each of the at least one infrastructure node based on the map scale, wherein a characteristic of the node graphical element is based on the communication recency; and overlaying the node graphical element on the locating interface based on the infrastructure location and the map scale.

8. The method of claim 7, further comprising:

retrieving a detection region for each of the at least one infrastructure node;

generating a detection range graphical element based on the detection region and the map scale, wherein a characteristic of the detection range graphical element is based on the communication recency; and overlaying the detection range graphical element on the locating interface based at least in part on the infrastructure location and the map scale.

9. The method of claim 7, further comprising:

retrieving a detection region for each of the at least one infrastructure node;

when the communication recency of the at least one infrastructure node is at a highest priority, generating a detection range graphical element based on the detection region and the map scale, wherein a color of the node graphical element is based on the communication recency; and overlaying the detection range graphical element on the locating interface based on the infrastructure location and the map scale.

10. The method of claim 7, further comprising:

determining at least two of the at least one infrastructure node having the communication recency of current communication;

retrieving a detection region for each of the at least two infrastructure nodes;

generating an overlap area graphical element for an overlap area between the detection region of each of the at least two infrastructure nodes; and overlaying the overlap area graphical element on the locating interface based on the infrastructure location and the map scale.

11. The method of claim 7, further comprising:

determining a current location of the client device;

generating a client device graphical element for the client device; and overlaying the client device graphical element on the locating interface based on the current location and the map scale.

12. The method of claim 1, further comprising:

retrieving a detection region for each of the at least one infrastructure node;

generating a detection range graphical element based on the detection region and the map scale; and overlaying the detection range graphical element on the mapping interface based at least in part on the infrastructure location and the map scale.

13. A method, comprising:

receiving an image captured by a client device of at least part of an environmental layout;

receiving at least two geographic feature locations associated with the image, the geographic feature locations being defined by user interaction with the client device displaying the image to identify points on the image;

determining a vector between at least two geographic locations identified from location information provided by infrastructure nodes corresponding to the at least two geographic feature locations;

determining a pixel distance between the at least two geographic feature locations in the image;

using the geographic feature locations, the at least two geographic locations corresponding to the at least two geographic feature locations, the vector, and the pixel distance to identify a map scale;

generating, based on the image, a geographic layout associated with an area depicted in the image;

outputting the geographic layout for use in a client device interface, wherein the map scale allows conversion between points on the image and geographic locations; and overlaying, on the geographic layout using the map scale, a node graphical element representing a location of an infrastructure node.

14. The method of claim 13, wherein the client device is the same device running the client device interface.

15. The method of claim 13, the outputting including storing the geographic layout in a cloud server for on-demand access by another client device.

16. The method of claim 13, further comprising:

receiving an indication of a tracking node to be tracked;

determining a location of the tracking node;

accessing a location database to retrieve at least part of the geographic layout associated with the determined location; and outputting the associated geographic layout to the client device.

17. The method of claim 13, further comprising:

receiving a location of an infrastructure node; and overlaying a graphical representation of the infrastructure node on the geographic layout at a position corresponding to the received location of the infrastructure node.

18. A method comprising:

determining a tracking node corresponding to an asset to be found;

identifying at least one infrastructure node having communicated with the tracking node;

determining, for each of the at least one infrastructure node, a communication recency between the infrastructure node and the tracking node, wherein a priority order of values for the communication recency from highest to lowest is: current communication, recently communicated, and past communication;

retrieving an infrastructure location for each of the at least one infrastructure node;

retrieving at least part of a geographic layout based on the infrastructure location;

generating a map scale of the geographic layout based on a pixel distance between geographic feature locations defined by user interaction with a client device displaying the geographic layout to identify points of each of the infrastructure nodes on the geographic layout and a vector between geographic locations of each of the infrastructure nodes, the geographic locations based on location information provided by each of the infrastructure nodes;

generating a locating interface based on the at least part of the geographic layout and according to the map scale;

generating a node graphical element for each of the at least one infrastructure node, wherein a characteristic of the node graphical element is based on the communication recency; and overlaying the node graphical element on the locating interface based on the infrastructure location and the map scale.

19. The method of claim 18, further comprising:

retrieving a detection region for each of the at least one infrastructure node;

generating a detection range graphical element based on the detection region, wherein a characteristic of the node graphical element is based on the communication recency; and overlaying the detection range graphical element on the locating interface based at least in part on the infrastructure location.

20. The method of claim 19, wherein communication between the tracking node at the at least one infrastructure node occurs only when the tracking node is within the detection region of the infrastructure node.

21. The method of claim 20, wherein the infrastructure node determines a range of the tracking node and communicates only when the range indicates the tracking node is within the detection region.

22. The method of claim 20, wherein the infrastructure node broadcasts its detection region and the tracking node communicates with the infrastructure node only when the tracking node determines it is within the detection region.

23. The method of claim 20, wherein the detection region is less than a maximum wireless communication range of the infrastructure node.

24. The method of claim 18, further comprising:

retrieving a detection region for each of the at least one infrastructure node;

when the communication recency of the at least one infrastructure node is at a highest priority, generating a detection range graphical element based on the detection region and the map scale, wherein a color of the node graphical element is based on the communication recency; and overlaying the detection range graphical element on the locating interface based on the infrastructure location and the map scale.

\* \* \* \* \*